United States Patent
Yoshimoto et al.

(10) Patent No.: US 10,972,224 B2
(45) Date of Patent: Apr. 6, 2021

(54) BASE STATION APPARATUS, TERMINAL APPARATUS, AND COMMUNICATION METHOD THEREOF

(71) Applicants: SHARP KABUSHIKI KAISHA, Sakai (JP); FG INNOVATION COMPANY LIMITED, Tuen Mun. New Territories (HK)

(72) Inventors: Takashi Yoshimoto, Sakai (JP); Jungo Goto, Sakai (JP); Osamu Nakamura, Sakai (JP); Yasuhiro Hamaguchi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/311,057

(22) PCT Filed: Apr. 28, 2017

(86) PCT No.: PCT/JP2017/016923
§ 371 (c)(1),
(2) Date: Dec. 18, 2018

(87) PCT Pub. No.: WO2018/003275
PCT Pub. Date: Jan. 4, 2018

(65) Prior Publication Data
US 2019/0327030 A1    Oct. 24, 2019

(30) Foreign Application Priority Data

Jun. 27, 2016  (JP) .............................. JP2016-126323
Jun. 27, 2016  (JP) .............................. JP2016-126324

(51) Int. Cl.
*H04W 28/04*   (2009.01)
*H04L 1/16*    (2006.01)

(52) U.S. Cl.
CPC ........... *H04L 1/1607* (2013.01); *H04W 28/04* (2013.01)

(58) Field of Classification Search
None
See application file for complete search history.

(56) References Cited

U.S. PATENT DOCUMENTS

| | | | |
|---|---|---|---|
| 2010/0054188 A1* | 3/2010 | Matsumoto | H04L 1/1829 370/328 |
| 2012/0163322 A1* | 6/2012 | Larmo | H04L 1/1854 370/329 |

(Continued)

OTHER PUBLICATIONS

"3rd Generation Partnership Project; Technical Specification Group Radio Access Network; Study on Scenarios and Requirements for Next Generation Access Technologies; (Release 14)", 3GPP TR 38.913 V0.3.0 (Mar. 2016).

(Continued)

*Primary Examiner* — Jenkey Van
(74) *Attorney, Agent, or Firm* — ScienBiziP, P.C.

(57) ABSTRACT

To provide a base station apparatus, a terminal apparatus, and a communication method capable of efficiently performing retransmission control for small size data in grant-free multiple access where the base station apparatus accommodates a large number of terminal apparatuses. The base station apparatus for communicating with multiple terminal apparatuses, the base station apparatus including a receiver configured to receive an identification signal identifying a terminal apparatus having transmitted uplink data and the uplink data, and a transmitter configured to transmit a delivery confirmation signal for the uplink data, wherein the delivery confirmation signal includes a bundled delivery confirmation signal for the uplink data received on an identical time resource and an identical frequency resource, and a delivery confirmation signal for each terminal appa- (Continued)

ratus, the bundled delivery confirmation signal is associated with a parameter shared by the terminal apparatuses having transmitted the uplink data received on the identical time resource and the identical frequency resource, and the delivery confirmation signal for each terminal apparatus is associated with a parameter specific to the terminal apparatus.

5 Claims, 15 Drawing Sheets

(56) References Cited

U.S. PATENT DOCUMENTS

| | | | | |
|---|---|---|---|---|
| 2012/0250652 | A1* | 10/2012 | Nakao | H04B 1/7103 |
| | | | | 370/329 |
| 2013/0044722 | A1* | 2/2013 | Kang | H04L 1/1861 |
| | | | | 370/329 |
| 2014/0254544 | A1* | 9/2014 | Kar Kin Au | H04L 1/0038 |
| | | | | 370/330 |
| 2016/0338089 | A1* | 11/2016 | Vos | H04L 5/16 |
| 2017/0290052 | A1* | 10/2017 | Zhang | H04W 74/004 |
| 2019/0158249 | A1* | 5/2019 | Harada | H04L 1/1864 |

OTHER PUBLICATIONS

"WF on Scenarios for Multiple Access", 3GPP TSG RAN WG1 #85 Meeting Nanjing, China, May 23-27, 2016, R1-165595, ZTE, ZTE Microelectronics, InterDigital, Qualcomm Inc., Spreadtrum.

\* cited by examiner

US 10,972,224 B2

BASE STATION APPARATUS, TERMINAL APPARATUS, AND COMMUNICATION METHOD THEREOF

TECHNICAL FIELD

The present invention relates to a base station apparatus, a terminal apparatus, and a communication method thereof.

BACKGROUND ART

In a communication systems specified in the Third Generation Partnership Project (3GPP) such as Long Term Evolution (LTE) and LTE-Advanced (LTE-A), a terminal apparatus (User Equipment: UE) uses a Scheduling Request (SR) or a Buffer Status Report (BSR) to request a radio resource for transmitting uplink data to a base station apparatus (evolved Node B: eNodeB). The base station apparatus gives an uplink transmission allowance (UL Grant) to each terminal apparatus, based on the SR or the BSR. After receiving control information about a UL Grant from the base station apparatus, the terminal apparatus transmits uplink data on a prescribed radio resource, based on uplink transmission parameters included in the UL Grant.

In a case that the base station apparatus successfully receives the uplink data, the base station apparatus transmits a positive Acknowledgement (ACK) in downlink to the terminal apparatus after elapse of a prescribed time from receiving the uplink data. On the other hand, in a case of not successfully receiving the uplink data, the base station apparatus transmits a Negative Acknowledgement (NACK) to the terminal apparatus after elapse of a prescribed time from receiving the uplink data. The terminal apparatus receiving the NACK retransmits data associated with the uplink data. In this way, the base station apparatus controls all uplink data transmissions (data transmissions from the terminal apparatus to the base station apparatus). The base station apparatus controlling the uplink radio resource allows Orthogonal Multiple Access (OMA) to be realized.

The 3GPP has been specifying a radio access technology for realizing Massive Machine Type Communications (mMTC) as the fifth generation mobile communication system (5G) (NPL 1). In the mMTC, it is assumed that a large number of devices including the terminal apparatus and a sensor transmit and/or receive small data. For uplink mMTC, grant-free Non-Orthogonal Multiple Access (NOMA) has been discussed (NPL 2). The grant-free non-orthogonal multiple access permits that data transmitted from the terminal apparatuses the number of which exceeds the number of receive antennas of the base station apparatus is non-orthogonally multiplexed in space. In the grant-free non-orthogonal multiple access, the terminal apparatus transmits the uplink data to the base station apparatus without the SR transmission, the UL Grant reception, or the like. For this reason, in the grant-free non-orthogonal multiple access, even in the case that a large number of devices transmit and/or receive small size data, increase in overhead due to the control information can be suppressed. In the grant-free non-orthogonal multiple access, a time taken from generation to transmission of transmission data can be also shortened because the UL Grant reception and the like are not performed.

CITATION LIST

Non Patent Literature

NPL 1: "3rd Generation Partnership Project; Technical Specification Group Radio Access Network; Study on Scenarios and Requirements for Next Generation Access Technologies; (Release 14)" 3GPP TR 38.913 v0.3.0 (2016-03)

NPL 2: RI-165595, 3GPP TSG RAN WG1#85 Meeting, Nanjing, China, May 23-27, 2016

SUMMARY OF INVENTION

Technical Problem

However, in the grant-free non-orthogonal multiple access where the base station apparatus accommodates a large number of terminal apparatuses, as a large number of pieces of the small size uplink data are transmitted, transmission of the ACK and NACK to the uplink data increases. Therefore, the downlink radio resource is tightened. In the grant-free non-orthogonal multiple access, the terminal apparatus transmits the uplink data without the UL Grant reception. For this reason, in retransmission control for the grant-free non-orthogonal multiple access, unlike the orthogonal multiple access controlling the uplink radio resource, the base station apparatus needs to transmit an ACK or a NACK for the uplink data where uplink resource allocation or the like is not controlled (that is, the uplink resource that is used to transmit the uplink data is not known).

The present invention has been made in consideration of such a circumstance, and has an object to provide a base station apparatus, a terminal apparatus, and a communication method capable of efficiently performing the retransmission control for the small size data in the grant-free multiple access where the base station apparatus accommodates a large number of terminal apparatuses.

Solution to Problem

To address the above-mentioned problems, a base station apparatus, a terminal apparatus, and a communication method according to the present invention are configured as follows.

(1) An aspect of the present invention is a base station apparatus for communicating with multiple terminal apparatuses, the base station apparatus including: a receiver configured to receive an identification signal identifying each terminal apparatus having transmitted uplink data and the uplink data; and a transmitter to transmit a signal indicating a delivery confirmation for the uplink data, wherein the signal indicating the delivery confirmation includes a signal indicating a bundled delivery confirmation for the uplink data received on an identical time resource and an identical frequency resource, and a signal indicating a delivery confirmation for each terminal apparatus, the signal indicating the bundled delivery confirmation is associated with a parameter shared by the terminal apparatuses having transmitted the uplink data received on the identical time resource and the identical frequency resource, and the signal indicating the delivery confirmation for each terminal apparatus is associated with a parameter specific to the terminal apparatus.

(2) According to an aspect of the present invention, the transmitter multiplies the signal indicating the bundled delivery confirmation by a sequence generated using the parameter shared by the terminal apparatuses, and adds a cyclic redundancy check scrambled with the parameter specific to the terminal apparatus to the signal indicating the delivery confirmation for each terminal apparatus.

(3) According to an aspect of the present invention, the parameter specific to the terminal apparatus includes a sequence of the identification signal.

(4) According to an aspect of the present invention, the parameter specific to the terminal apparatus includes a cyclic shift amount applied to the sequence of the identification signal.

(5) According to an aspect of the present invention, the parameter shared by the terminal apparatuses includes a subframe number that the identification signal has been transmitted.

(6) According to an aspect of the present invention, the parameter shared by the terminal apparatuses includes a subframe number that the uplink data has been transmitted.

(7) An aspect of the present invention is a terminal apparatus for communicating with a base station apparatus, the terminal apparatus including: a transmitter configured to transmit an identification signal indicating that the terminal apparatus itself transmits uplink data and the uplink data; and a receiver configured to receive a signal indicating a delivery confirmation for the uplink data, wherein the receiver tries to receive the signal indicating the delivery confirmation through despread processing using a sequence of the identification signal and descramble processing using a sequence generated using a subframe number that the identification signal sequence or the uplink data has been transmitted.

(8) According to an aspect of the present invention, in a case that the receiver receives a delivery confirmation signal including a negative acknowledgement through the despread processing using the identification signal sequence, the transmitter retransmits data bits and parity bits constituting the uplink data.

(9) An aspect of the present invention is a communication method of a base station apparatus for communicating with multiple terminal apparatuses, the communication method including the steps of: receiving an identification signal identifying each terminal apparatus having transmitted uplink data and the uplink data; and transmitting a signal indicating a delivery confirmation for the uplink data, wherein the signal indicating the delivery confirmation includes a signal indicating a bundled delivery confirmation for the uplink data received on an identical time resource and an identical frequency resource, and a signal indicating a delivery confirmation for each terminal apparatus, the signal indicating the bundled delivery confirmation is associated with a parameter shared by the terminal apparatuses having transmitted the uplink data received on the identical time resource and the identical frequency resource, and the signal indicating the delivery confirmation for each terminal apparatus is associated with a parameter specific to the terminal apparatus.

(10) An aspect of the present invention is a communication method of a terminal apparatus for performing communication with a base station apparatus, the communication method including the steps of: transmitting an identification signal indicating that the terminal apparatus itself transmits uplink data and the uplink data; and receiving a signal indicating a delivery confirmation for the uplink data, wherein in the step of receiving, the signal indicating the delivery confirmation is tried to be received through despread processing using a sequence of the identification signal and descramble processing using the sequence of the identification signal or a sequence generated using a sub-frame number that the identification signal sequence or the uplink data has been transmitted.

Advantageous Effects of Invention

According to one or multiple aspects of the present invention, the retransmission control for the uplink data can be efficiently performed in the grant-free multiple access where the base station apparatus accommodates a large number of terminal apparatuses.

DESCRIPTION OF EMBODIMENTS

A communication system according to the present embodiment includes a base station apparatus (cell, small cell, serving cell, component carrier, eNodeB, Home eNodeB) and a terminal apparatus (terminal, mobile terminal, User Equipment: UE). In the communication system, for downlink, the base station apparatus serves as a transmission device (transmission point, group of transmit antennas, group of transmit antenna ports) and the terminal apparatus serves as a reception device (reception point, reception terminal, group of receive antennas, group of receive antenna ports). For uplink, the base station apparatus serves as a reception device and the terminal apparatus serves as a transmission device. The communication system is also applicable to Device-to-Device (D2D) communication. In this case, a transmission device and a reception device are implemented by terminal apparatuses.

The communication system is not limited to data communication between the terminal apparatus and the base station apparatus intervened by a human, and is also applicable to data communication form not requiring the human intervene such as Machine Type Communication (MTC), Machine-to-Machine Communication (M2M communication), communication for Internet of Things (IoT), and Narrow Band-IoT (NB-IoT) (hereinafter, referred to as the MTC). In this case, the terminal apparatus is a MTC terminal. Note that the following description describes a case that Discrete Fourier Transform Spread-Orthogonal Frequency Division Multiplexing (DFTS-OFDM, also referred to as SC-FDMA) transmission is used for the uplink, and OFDM transmission is used for the downlink, but the present embodiment is not limited to this case and another transmission method can be applied.

The base station apparatus and terminal apparatus according to the present embodiment can perform communication using a frequency band which is a so-called licensed band and is licensed (certificated) for use by a country or region where wireless operator provide services, and/or a frequency band which is a so-called unlicensed band and does not require to be licensed (certificated) for use by a country or region.

In the present embodiment, "X/Y" includes the meaning of "X or Y". In the present embodiment, "X/Y" includes the meaning of "X and Y". In the present embodiment, "X/Y" includes the meaning of "X and/or Y".

First Embodiment

Figure 1:
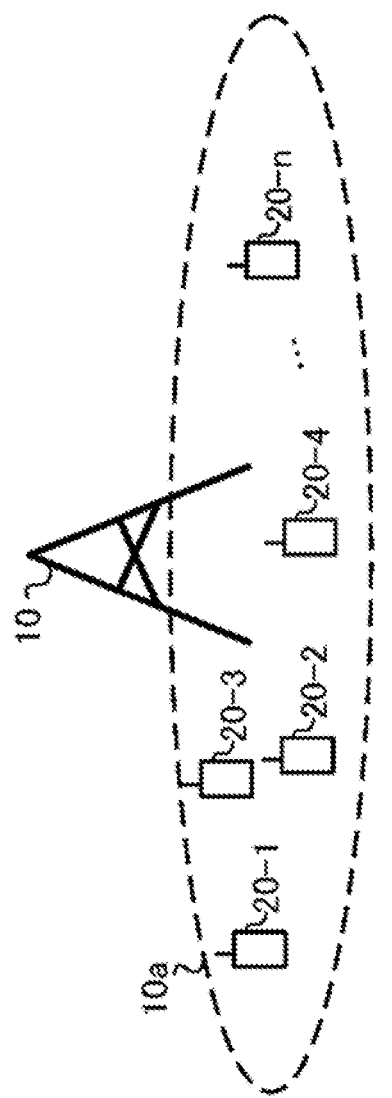
FIG. 1 is a diagram illustrating an example of a communication system according to a first embodiment.

FIG. 1 is a diagram illustrating a configuration example of a communication system according to the present embodiment. The communication system according to the present embodiment includes a base station apparatus 10, and terminal apparatuses 20-1 to 20-n (n is a natural number). The terminal apparatuses 20-1 to 20-n are also collectively referred to as terminal apparatuses 20. A coverage 10a is a range (communication area) (also referred to as a cell) in which the base station apparatus 10 can connect to the terminal apparatuses 20.

In FIG. 1, the base station apparatus 10 and the terminal apparatuses 20 support the grant-free (also referred to as grant-less, contention based) multiple access in the uplink. In the grant-free multiple access, the terminal apparatus 20 transmits the uplink data independently from reception of an uplink transmission allowance (uplink grant: UL Grant, also referred to as a scheduling grant) from the base station apparatus 10 (without receiving the UL Grant). The grant-free multiple access allows the uplink data transmitted by multiple terminal apparatuses to overlap (collide) with each other in a time/frequency/spatial resource. The grant-free multiple access allows that, in a case that the terminal apparatuses 20 transmit the uplink data at an identical time and at an identical frequency, the terminal apparatuses 20 are connected in the non-orthogonal multiple access as well as the orthogonal multiple access (therefore, also referred to as a grant-free UpLink Non-Orthogonal Multiple Access: UL-NOMA). For example, in the non-orthogonal multiple access, uplink data signals transmitted from the terminal apparatuses the number of which exceeds the number of receive antennas of the base station apparatus are non-orthogonally multiplexed in space. Note that the base station apparatus 10 and the terminal apparatuses 20 may support a multiple access where each terminal apparatus transmits the uplink data, based on the scheduling grant.

The base station apparatus 10 detects the uplink data signals transmitted by the terminal apparatuses connected in the grant-free multiple access. The base station apparatus 10 may include, in order to detect the uplink data signals, Symbol Level Interference Cancellation (SLIC) configured to cancel an interference based on a demodulation result of an interference signal, Codeword Level Interference Cancellation (CWIC) configured to cancel the interference based on a decoding result of the interference signal, turbo equalization, maximum likelihood detection (maximum likelihood: ML, Reduced complexity maximum likelihood: R-ML) configured to search for the most likely signal to be transmitted among the transmit signal candidates, Enhanced Minimum Mean Square Error-Interference Rejection Combining (EMMSE-IRC) configured to prevent the interference signal by linear computation, or the like. A transmit power for each uplink data signal may be configured such that a received power difference occurs in the base station apparatus.

Note that, although the following description describes a case that, in the grant-free multiple access, the base station apparatus adopts an Advanced Receiver using the turbo equalization or the like to detect the non-orthogonally multiplexed uplink data signal, the embodiment is not limited to this case so long as the uplink data signal can be detected. For example, a multiple access based on interleaving such as Interleaved Division Multiple Access (IDMA) may be used to perform the grant-free multiple access. In this case, the base station apparatus detects the uplink data signal transmitted by each terminal apparatus based on an interleaver pattern applied to the uplink data signal (performs deinterleaving processing). A code-based multiple access may be used to perform the grant-free multiple access. In this case, the base station apparatus detects the uplink data signal transmitted by each terminal apparatus, based on a code sequence (spread code) by which the uplink data signal is multiplied.

In FIG. 1, the following uplink physical channels are included in the uplink radio communication. The uplink physical channels are used for transmitting information output from a higher layer.

Physical uplink control channel
Physical uplink shared channel
Physical random access channel The physical uplink control channel is a physical channel used to transmit Uplink Control Information (UCI).

The uplink control information includes a positive acknowledgement (ACK)/negative acknowledgement (NACK) for the downlink data (downlink transport block, Downlink-Shared Channel: DL-SCH). The ACK/NACK is also referred to as a signal indicating a delivery confirmation, HARQ-ACK, or HARQ feedback.

The uplink control information includes downlink Channel State Information (CSI). The channel state information includes a Rank Indicator (RI) indicating a suited spatial multiplexing number (the number of layers), a Precoding Matrix Indicator (PMI) indicating a suited precoder, a Channel Quality Indicator (CQI) specifying a suited transmission rate, and the like. The PMI indicates a codebook determined by a terminal apparatus. The codebook is associated with precoding for a physical downlink shared channel. The CQI can be a suited modulation scheme (e.g., QPSK, 16QAM, 64QAM, 256QAM, or the like) and suited coding rate in a predetermined band.

The physical uplink shared channel is a physical channel used to transmit the uplink data (uplink transport block, UL-SCH). The physical uplink shared channel may be used to transmit the ACK/NACK and/or channel state information for the downlink data. The physical uplink shared channel may be used to transmit the uplink control information. The physical uplink shared channel may be generated by adding a Cyclic Redundancy Check (CRC) to the uplink data. The physical uplink shared channel is transmitted based on the grant-free/scheduling grant.

The physical uplink shared channel is used to transmit a Radio Resource Control (RRC) message. The RRC message is information/signal processed in a radio resource control layer. The physical uplink shared channel is used to transmit a MAC Control Element (CE). The MAC CE is information/signal processed (transmitted) in a Medium Access Control (MAC) layer. For example, a power headroom may be included in the MAC CE and may be reported via the physical uplink shared channel. In other words, a MAC CE field is used to indicate a level of the power headroom. The uplink data can include that RRC message and the MAC CE.

The physical random access channel is used to transmit a preamble used for random access.

In the uplink radio communication, an UpLink Reference Signal (UL RS) is used as an uplink physical signal. The uplink physical signal is not used to transmit information output from higher layers, but is used by the physical layer. The uplink reference signal includes a Demodulation Reference Signal (DMRS) and a Sounding Reference Signal (SRS).

The DMRS is associated with transmission of the physical uplink shared channel or physical uplink control channel. For example, the base station apparatus 10 uses the DMRS to perform channel compensation in demodulating the physical uplink shared channel or the physical uplink control channel. The SRS is not associated with the transmission of the physical uplink shared channel or physical uplink control channel. For example, the base station apparatus 10 uses the SRS to measure the uplink channel state (CSI Measurement).

In FIG. 1, in the downlink radio communication, the following downlink physical channels are used. The downlink physical channels are used for transmitting information output from the higher layers.
  Physical broadcast channel
  Physical downlink control channel
  Physical downlink shared channel The physical broadcast channel is used for broadcasting a Master Information Block (MIB, a Broadcast Channel (BCH)) that is shared by the terminal apparatuses. The MIB is system information. The physical broadcast channel includes system control information to be broadcasted. For example, the physical broadcast channel includes the information such as a downlink system band, a System Frame number (SFN), and the number of transmit antennas used by the eNB. The physical broadcast channel may include configuration information of a channel including a retransmission request indicator (including a hybrid automatic retransmission request indicator). The configuration information of a channel including the retransmission request indicator can include information about a transmission resource for the channel, information about a transmission duration, information about a kind of ACK/NACK, information about a transmission timing of an ACK/NACK, information about a retransmission timing, information indicating identification signal, and the like.

The physical downlink control channel is used to transmit Downlink Control Information (DCI). In the downlink control information, multiple formats (also referred to as DCI formats) are defined based on an intended use. Each format is used depending on the intended use. The downlink control information includes the control information for downlink data transmission and the control information for uplink data transmission. The downlink control information can include information about retransmission of the uplink data (physical uplink shared channel).

A DCI format for the downlink data transmission is used for scheduling the physical downlink shared channel. The DCI format for the downlink data transmission is also referred to as a downlink grant (or a downlink assignment). The DCI format for the downlink data transmission includes the downlink control information such as information about physical downlink shared channel resource allocation and information about a Modulation and Coding Scheme (MCS) for the physical downlink shared channel. The DCI format for the downlink data transmission may include a Transmission Power Control (TPC) command for a physical uplink channel (e.g., physical uplink control channel, physical uplink shared channel).

The DCI format for the downlink data transmission may include information about a retransmission for the uplink data (transport block, codeword). The information about an uplink data retransmission can include information indicating an ACK/NACK (New Data Indicator (NDI, New Date Indicator)), information indicating a retransmission timing, information indicating a frequency resource for retransmission, information about a kind of ACK/NACK, information about a transmission timing of an ACK/NACK, information indicating an identification signal, and the like.

A DCI format for the uplink data transmission is used to broadcast the control information about a physical uplink shared channel transmission to the terminal apparatus. The DCI format for the uplink data transmission can include the uplink control information such as information about an MCS for the physical uplink shared channel, information about an uplink data (physical uplink shared channel) retransmission, information about a cyclic shift for a DMRS, a TPC command for the physical uplink shared channel, and a downlink Channel State Information (CSI, also referred to as reception quality information) request (CSI request). The information about an uplink data retransmission can include information indicating an ACK/NACK (New Data Indicator (NDI, New Date Indicator)), information about Redundancy Version (RV) of the physical uplink shared channel, information indicating a retransmission timing, information indicating a frequency resource for retransmission, information about a kind of ACK/NACK, information about a transmission timing of an ACK/NACK, information indicating an identification signal (e.g., an identification signal used for retransmission), and the like. The transmission timing of an ACK/NACK can be configured differently between the scheduling grant transmission and the grant-free transmission. Note that in a case that the base station apparatus causes the terminal apparatus to transmit the uplink data based on the scheduling grant, the DCI format for the uplink data transmission can include information about a physical uplink shared channel resource allocation.

The physical downlink control channel is generated by adding a Cyclic Redundancy Check (CRC) to the downlink control information. In the physical downlink control channel, CRC parity bits are scrambled (in other words, exclusive-ORed or masked) with a prescribed identifier. For example, the CRC parity bits are scrambled with a Cell-Radio Network Temporary Identifier (C-RNTI) as the identifier. For the C-RNTI, an identifier unique to the grant-free transmission may be defined which is distinguished from an identifier for the scheduling grant. The identifier may be associated with a signal identifying the terminal apparatus or a signal identifying the uplink data signal in the grant-free transmission.

In the downlink radio communication in FIG. 1, the downlink physical channel can include a physical channel (also referred to as a physical retransmission request indicator channel, physical ACK/NACK channel, physical delivery confirmation channel) including a retransmission request indicator of an ACK/NACK transmission or the like. The physical retransmission request indicator channel is a physical channel used to transmit an ACK/NACK (delivery confirmation) for the uplink data (transport block, codeword) received by the base station apparatus. The physical retransmission request indicator channel can be used to transmit a HARQ indicator (a HARQ feedback, or a signal indicating a delivery confirmation) indicating an ACK/NACK for the uplink data. The terminal apparatus notifies the higher layer of the received ACK/NACK. The HARQ indicator can include an ACK indicating a successful reception (detection), a NACK indicating a non-successful reception, and a DTX indicating there is no corresponding data. The physical retransmission request indicator channel can include, in addition to the information indicating an ACK/NACK, the information about a retransmission such as information indicating a retransmission timing, information indicating a frequency resource for retransmission, and information indicating an identification signal.

The physical retransmission request indicator channel can associate information about a bit sequence indicating an ACK/NACK or the retransmission with the identifier unique to the grant-free transmission. For example, the physical retransmission request indicator channel may be generated by adding a cyclic redundancy check (CRC) to the bit sequence indicating the information about an ACK/NACK or retransmission, and the like. The CRC parity bits are scrambled (in other words, exclusive-ORed or masked) with a sequence associated with the identifier unique to the grant-free transmission.

As another aspect, the physical retransmission request indicator channel can be generated by multiplying the bit sequence indicating the information about an ACK/NACK or retransmission by the sequence associated with the identifier unique to the grant-free transmission. The bit sequence indicating the information about an ACK/NACK or retransmission is spread by the sequence associated with the identifier unique to the grant-free transmission.

The identifier unique to the grant-free transmission may be associated with a resource on which the uplink data has been transmitted. For example, the identifier unique to the grant-free transmission is associated with a subframe number/slot number/symbol number/system frame number that the uplink data has been transmitted. The identifier unique to the grant-free transmission is associated with a frequency resource on which the uplink data has been transmitted. The sequence associated with the identifier unique to the grant-free transmission is generated using the subframe number/slot number/symbol number/frequency resource (as a generation parameter) that the uplink data has been transmitted. The base station apparatus and the terminal apparatus calculate the identifier unique to the grant-free transmission by using the subframe number/slot number/symbol number/frequency resource that the uplink data has been transmitted. For example, assuming that the sequence associated with the identifier unique to the grant-free transmission=1+the subframe number that the uplink data has been transmitted (0≤subframe number<10), the base station apparatus can calculate the identifier unique to the grant-free transmission by recognizing the subframe number that the uplink data has been received. Note that the calculation formula for the sequence associated with the identifier unique to the grant-free transmission can include an index indicating the frequency resource on which the uplink data has been transmitted.

The identifier unique to the grant-free transmission may be associated with a subframe number/slot number/symbol number/system frame number that an ACK/NACK is transmitted. The identifier unique to the grant-free transmission may be associated with a frequency resource that an ACK/NACK is transmitted. The sequence associated with the identifier unique to the grant-free transmission is generated using the subframe number/slot number/symbol number/frequency resource that an ACK/NACK is transmitted. For example, assuming that the sequence associated with the identifier unique to the grant-free transmission=1+the subframe number that an ACK/NACK is transmitted (0≤subframe number<10), the base station apparatus can calculate the identifier unique to the grant-free transmission by recognizing the subframe number that the ACK/NACK is transmitted. Note that the calculation formula for the sequence associated with the identifier unique to the grant-free transmission can include an index indicating the frequency resource that an ACK/NACK is transmitted.

The identifier unique to the grant-free transmission may be associated with the resource on which the identification signal has been transmitted. For example, the identifier unique to the grant-free transmission is associated with a subframe number/slot number/system frame number that the identification signal has been transmitted. The identifier unique to the grant-free transmission may be associated with a frequency resource on which the identification signal has been transmitted. The sequence associated with the identifier unique to the grant-free transmission is generated using a subframe number/slot number/frequency resource (as a generation parameter) that the identification signal has been transmitted. The base station apparatus and the terminal apparatus calculate the identifier unique to the grant-free transmission by using the subframe number/slot number/frequency resource that the identification signal has been transmitted. For example, assuming that the sequence associated with the identifier unique to the grant-free transmission=1+the subframe number that the identification signal has been transmitted (0≤subframe number<10), the base station apparatus can calculate the identifier unique to the grant-free transmission by recognizing the subframe number that the identification signal has been received. In the communication system according to the present embodiment, a parameter shared by multiplexed terminal apparatuses is used as the generation parameter for the identifier unique to the grant-free transmission. Note that the calculation formula for the sequence associated with the identifier unique to the grant-free transmission can include an index indicating the frequency resource on which the identification signal has been transmitted.

Note that the identifier unique to the grant-free transmission may be notified to the terminal apparatus by the base station apparatus to be shared by both apparatuses. For example, the base station apparatus, at S201/S203 in FIG. 3, transmits the identifier unique to the grant-free transmission (or the parameter for calculating the identifier) to the terminal apparatus. As another aspect, the base station apparatus may use the downlink control information to transmit the identifier unique to the grant-free transmission (or the parameter for calculating the identifier) to the terminal apparatus.

The resource on which the physical retransmission request indicator channel is transmitted may be associated with the resource on which the uplink data has been transmitted in the grant-free multiple access. For example, the resource on which the physical retransmission request indicator channel is transmitted is associated with, in a frequency domain of the resource, the subframe number/slot number/symbol number/system frame number that the uplink data has been transmitted. The resource on which the physical retransmission request indicator channel is transmitted may be associated with, in the frequency domain of the resource, the frequency resource on which the uplink data has been transmitted. The base station apparatus and the terminal apparatus calculate the resource on which the physical retransmission request indicator channel is transmitted, by using the subframe number/slot number/symbol number/frequency resource index that the uplink data has been transmitted. Furthermore, the resource on which the physical retransmission request indicator channel is transmitted may be associated with, in the frequency domain of the resource, a downlink system bandwidth (e.g., the number of resource blocks in a system bandwidth). For example, the resource on which the physical retransmission request indicator channel is transmitted is calculated by performing a Modulo operation on the minimum frequency resource block index in the frequency resource blocks on which the uplink data has been transmitted with the number of resource blocks in the downlink system bandwidth. The base station apparatus can calculate the resource on which the physical retransmission request indicator channel is transmitted by recognizing the frequency resource on which the uplink data has been received.

The resource on which the physical retransmission request indicator channel is transmitted may be associated with the signal identifying the terminal apparatus (identification signal) in the grant-free multiple access. For example, the resource on which the physical retransmission request indicator channel is transmitted is associated with, in the frequency domain of the resource, the subframe number/slot number/system frame number that the identification signal has been transmitted. The resource on which the physical retransmission request indicator channel is transmitted may be associated with, in the frequency domain of the resource, the frequency resource on which the identification signal has been transmitted. The base station apparatus and the terminal apparatus calculate the resource on which the physical retransmission request indicator channel is transmitted, by using the subframe number/slot number/frequency resource index that the identification signal has been transmitted. Furthermore, the resource on which the physical retransmission request indicator channel is transmitted may be associated with, in the frequency domain of the resource, the downlink system bandwidth (e.g., the number of resource blocks in the system bandwidth). For example, the resource on which the physical retransmission request indicator channel is transmitted is calculated by performing a Modulo operation on the minimum frequency resource block index in the frequency resource blocks on which the identification signal has been transmitted with the number of resource blocks in the downlink system bandwidth. The base station apparatus can calculate the resource on which the physical retransmission request indicator channel is transmitted by recognizing the frequency resource on which the identification signal has been received.

In this way, in the grant-free multiple access, a sequence by which the physical retransmission request indicator channel is multiplied/sequence scrambled (masked) on the physical retransmission request indicator channel/resource allocated to the physical retransmission request indicator channel are associated with the identification signals of the multiplexed terminal apparatuses or the parameters for uplink data, such that the base station apparatus and the terminal apparatus can efficiently share the configuration of the physical retransmission request indicator channel.

The physical retransmission request indicator channel can be used to transmit a delivery confirmation for the grant-free transmission uplink data/delivery confirmation for the uplink data transmitted based on the scheduling grant. The physical retransmission request indicator channel can be configured differently depending on whether a delivery confirmation is for the grant-free transmission uplink data, or for the uplink data transmitted based on the scheduling grant. For example, the base station apparatus may configure that the physical retransmission request indicator channel transmitting multiple ACKs/NACKs by multiplying a spread code sequence is used for one of the delivery confirmations, and that the physical retransmission request indicator channel transmitting multiple ACKs/NACKs generated by adding a CRC is used for the other of the delivery confirmations. Note that the physical retransmission request indicator channel may be included in one DCI format of the physical downlink control channel.

The physical downlink shared channel is used to transmit the downlink data (downlink transport block, DL-SCH). The physical downlink shared channel is used to transmit a system information message. The system information message may include a system information block unique to the grant-free transmission. For example, the system information block unique to the grant-free transmission can include the configuration information such as the uplink resource (frequency band, etc.) for the grant-free transmission, the uplink resource for transmitting an ACK/NACK, and kind of ACK/NACK. Note that some or all of the system information messages may be included in the RRC message.

The physical downlink shared channel is used to transmit an RRC message. The RRC message can include a message for the configuration information about a grant-free transmission (also referred to as a grant-free transmission configuration assist information). The RRC message transmitted from the base station apparatus may be shared (cell-specific) by multiple terminal apparatuses. To be more specific, the information shared by the user equipment in the cell user is transmitted by using a cell-specific RRC message. The RRC message transmitted from the base station apparatus may be a dedicated message to a given terminal apparatus (also referred to as dedicated signaling). In other words, user-equipment-specific information (unique to user equipment) is transmitted using a message dedicated to the given terminal apparatus. Furthermore, the RRC message transmitted from the base station apparatus may be a message dedicated to the grant-free transmission. In other words, the information unique to the grant-free transmission may be transmitted using a message dedicated to the grant-free transmission.

The physical downlink shared channel is used to transmit the MAC CE. The RRC message and/or MAC CE is also referred to as higher layer signaling.

In the downlink radio communication in FIG. 1, a Synchronization signal (SS) and a Downlink Reference Signal (DL RS) are used as downlink physical signals. The downlink physical signals are not used for transmission of information output from the higher layers, but are used by the physical layer.

The synchronization signal is used for the terminal apparatus to take synchronization in the frequency domain and a time domain in the downlink. The downlink reference signal is used for the terminal apparatus to perform channel compensation on the downlink physical channel. For example, the downlink reference signal is used to demodulate the physical broadcast channel, the physical downlink shared channel, and the physical downlink control channel. The downlink reference signal can be also used for the terminal apparatus to calculate (measure, measurement) the downlink channel state information. The reference signal used for demodulating the channels may be different from the reference signal used for the measurement (e.g., Demodulation Reference Signal: DMRS and Cell-specific Reference Signal: CRS in LTE).

The downlink physical channels and the downlink physical signals are also collectively referred to as a downlink signal. The uplink physical channels and the uplink physical signals are also collectively referred to as an uplink signal. The downlink physical channels and the uplink physical channels are also collectively referred to as physical channels. The downlink physical signals and the uplink physical signals are also collectively referred to as physical signals.

The BCH, the UL-SCH, and the DL-SCH are transport channels. Channels used in the MAC layer are referred to as transport channels. A unit of the transport channels used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing or the like is performed for each codeword.

Figure 2:
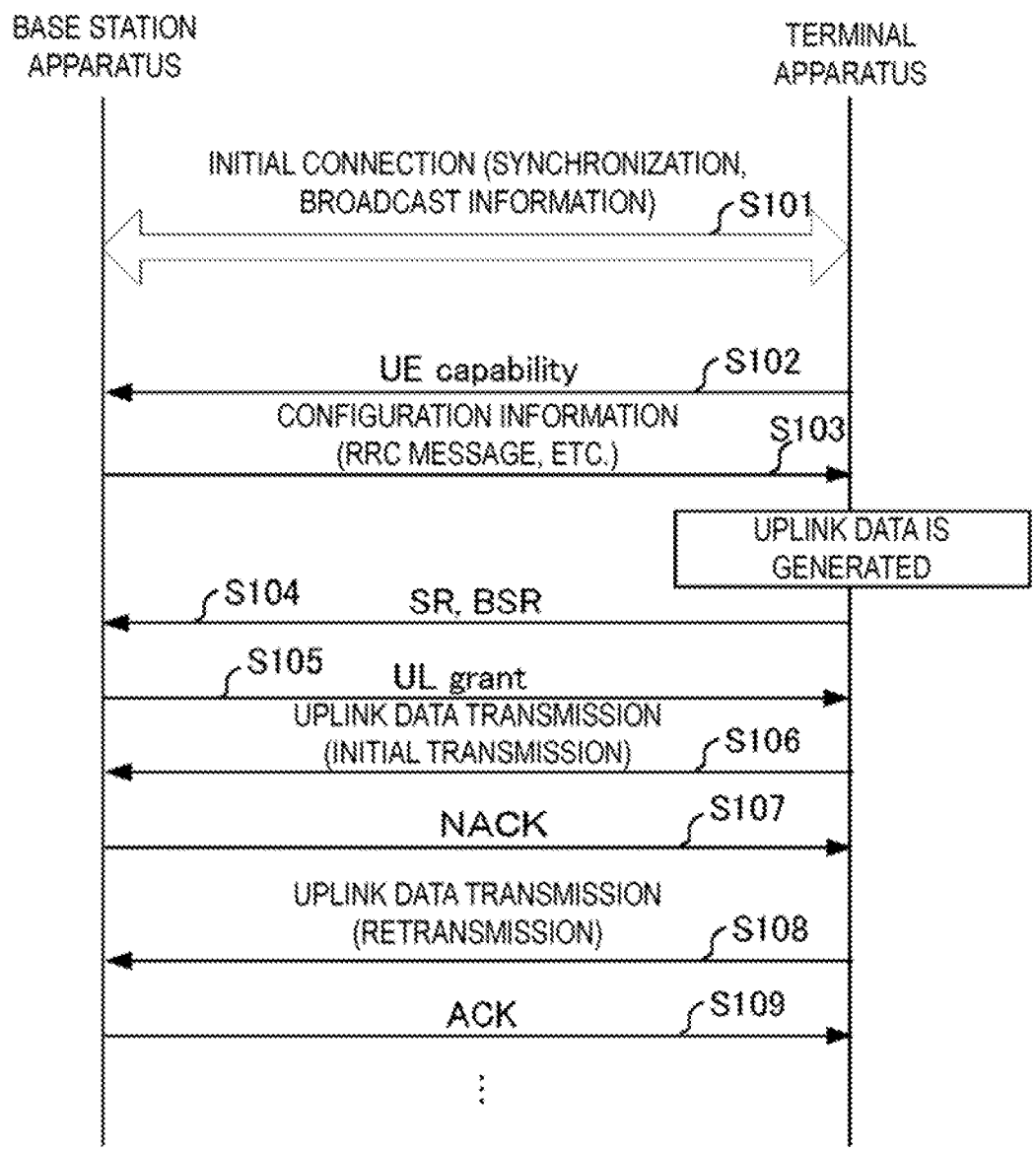
FIG. 2 is a diagram illustrating an example of a sequence between a base station apparatus and a communication device in a multiple access using a scheduling grant according to the first embodiment.

FIG. 2 is a diagram illustrating an example of a sequence between the base station apparatus and the communication device in the multiple access using the scheduling grant according to the present embodiment. The base station apparatus periodically transmits the synchronization signal and the broadcast channel in accordance with a prescribed radio frame format in the downlink. The terminal apparatus uses the synchronization signal, the broadcast channel, and the like to establish initial connection (S101). The terminal apparatus uses the synchronization signal to perform frame synchronization and symbol synchronization in the downlink. The terminal apparatus uses the broadcast channel to identify the system information such as the downlink system bandwidth, the System Frame Number (SFN), the number of antenna ports, and the configuration for the channel including the physical retransmission request.

The terminal apparatus transmits UE Capability (S102). The UE Capability is information for notifying the base station apparatus of a function supported by the terminal apparatus. For example, the UE Capability is transmitted using the RRC message and the like. The base station apparatus transmits the configuration information about a radio resource control to the terminal apparatus (S103). Note that at S101 to S103, the terminal apparatus can transmit the physical random access channel in order to acquire a resource for uplink synchronization or RRC connectivity request.

In a case that uplink data is generated, the terminal apparatus transmits a scheduling request (SR) or a buffer status report (BSR) (S104). The base station apparatus considers the BSR and the like to allocate a radio resource for uplink data transmission to each terminal apparatus. The base station apparatus uses the downlink control information to transmit the uplink transmission allowance (UL Grant) to the terminal apparatus (S105). The terminal apparatus transmits the uplink data on a prescribed radio resource, based on the uplink transmission parameter included in the UL Grant (such as the uplink resource allocation) (S106). The base station apparatus transmits an ACK/NACK for the uplink data (S107). S107 in FIG. 2 illustrates a case that a NACK is transmitted. In a case that the terminal apparatus receives the NACK, the terminal apparatus retransmits the data associated with that uplink data (S108). The data associated with the uplink data may be the same as the uplink data transmitted at an initial transmission (that is, data bits and parity bits transmitted at the initial transmission), or may be data not transmitted at the initial transmission (that is, data bits and parity bits not transmitted at the initial transmission). The data associated with the uplink data may be data including both the uplink data transmitted at the initial transmission and the data not transmitted at the initial transmission. At S108, in a case that the terminal apparatus receives an ACK, the terminal apparatus transmits new uplink data (initial transmission).

In the case of the retransmission, the base station apparatus uses the uplink data (initial transmission) received at S106 and the downlink data (retransmission) received at S108 to perform signal detection processing. In the detection processing, the base station apparatus can use Chase combining and Incremental Redundancy (IR). The base station apparatus transmits an ACK/NACK for the detection processing (S109). S109 in FIG. 2 illustrates a case that an ACK is transmitted.

Figure 3:
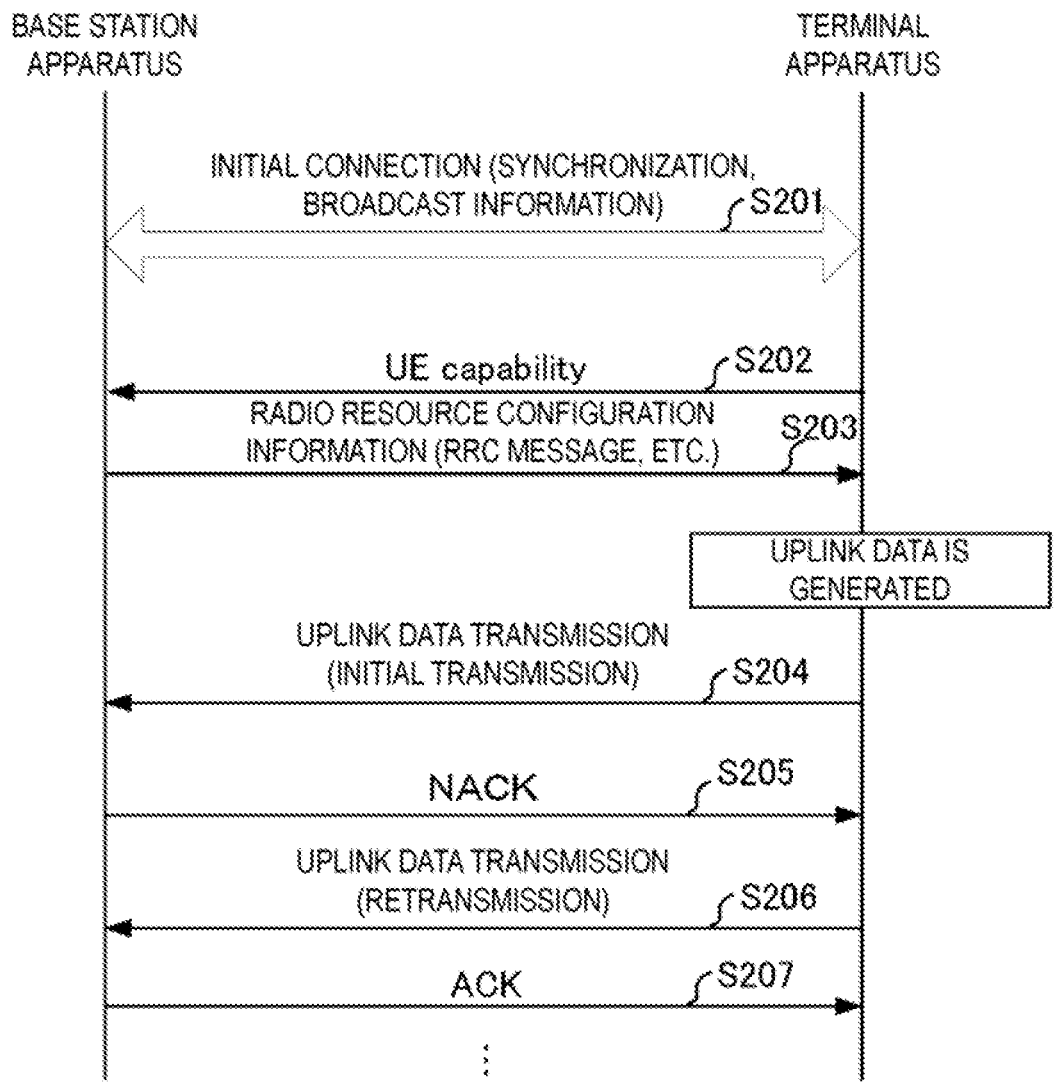
FIG. 3 is a diagram illustrating an example of a sequence between the base station apparatus and the communication device in the multiple access using a grant-free according to the first embodiment.

FIG. 3 is a diagram illustrating an example of a sequence between the base station apparatus and the communication device in the multiple access using the grant-free according to the present embodiment. The base station apparatus 10 periodically transmits a synchronization signal in accordance with a prescribed radio frame format in the downlink. The base station apparatus 10 transmits a broadcast channel. The terminal apparatus uses the synchronization signal, the broadcast channel, and the like to establish the initial connection (S201). The terminal apparatus uses the synchronization signal to perform the frame synchronization and the symbol synchronization in the downlink. The terminal apparatus uses the broadcast channel to identify the system information such as the downlink system bandwidth, the system frame number, the number of antenna ports, and the configuration for the channel including the physical retransmission request. In a case that the broadcast channel includes the configuration information for the grant-free transmission, the terminal apparatus identifies a configuration for the grant-free transmission in the connected cell. The configuration information about a grant-free transmission can include information indicating that the base station apparatus supports the grant-free transmission, an area capable of the grant-free transmission, information about terminal apparatus identification (information indicating an identification signal or the like), and the like.

The terminal apparatus transmits the UE Capability (S202). The base station apparatus can use the UE Capability to identify whether or not the terminal apparatus supports the grant-free multiple access. For example, the UE Capability is transmitted using the RRC message and the like. Note that at S201 to S203, the terminal apparatus can transmit the physical random access channel in order to acquire a resource for uplink synchronization or RRC connectivity request.

The base station apparatus transmits the configuration information about a radio resource control to the terminal apparatus (S203). The configuration information for the radio resource control is transmitted using the RRC message and the like. The configuration information about a radio resource control can include the configuration information about a grant-free transmission. The configuration information about a grant-free transmission can include an area capable of the grant-free transmission, information about a terminal apparatus identification, information indicating a retransmission timing, information indicating a frequency resource for retransmission, information indicating an ACK/NACK transmission timing, information indicating a kind of ACK/NACK, information indicating an identification signal, and the like. In this case, the terminal apparatus uses the configuration information about a radio resource control to identify the configuration information for the grant-free transmission. Note that some or all pieces of the configuration information about a grant-free transmission may be notified by the downlink control information.

In a case that uplink data is generated, the terminal apparatus supporting the grant-free transmission transmits the uplink data without acquiring the UL Grant from the base station apparatus (S204). At S204, the terminal apparatus can transmit the identification signal allocated to the terminal apparatus itself and the uplink data. The base station apparatus uses the identification signal to identify the terminal apparatus and detect the uplink data transmitted by the identified terminal apparatus. The base station apparatus transmits an ACK/NACK for the uplink data, based on the ACK/NACK transmission timing (S205). The base station apparatus can use the physical downlink control channel/ physical retransmission request indicator channel in the ACK/NACK transmission. In a case that the base station apparatus successfully detects the uplink data, the base station apparatus transmits an ACK to the terminal apparatus. On the other hand, in a case that the base station apparatus fails to successfully detect the uplink data, the base station apparatus transmits a NACK to the terminal apparatus (S205 in FIG. 3 illustrates a case that the base station apparatus transmits the NACK). The base station apparatus may transmit at S205 the information about a retransmission such as the information indicating a retransmission timing, the information indicating a frequency resource for retransmission, and the like. Each of the terminal apparatuses multiplexed at S204 on the identical time resource and frequency resource may use, for retransmission, time resource/frequency resource different from the initial transmission.

In the case that the terminal apparatus receives the NACK at S205, the terminal apparatus retransmits the same data as the uplink data (the data bits and parity bits transmitted at the initial transmission) (S206). The uplink data of the retransmission may be data including both the data bits and parity bits transmitted at the initial transmission, and the data bits and parity bits not transmitted at the initial transmission. In a case that the terminal apparatus receives an ACK at S205, the terminal apparatus transmits new uplink data (initial transmission).

In the case of retransmission, the base station apparatus uses the uplink data (retransmission) received at S206 to perform the detection processing. The base station apparatus transmits an ACK/NACK based on a result of the detection processing (S207). S207 in FIG. 2 illustrates a case that an ACK is transmitted. Note that the base station apparatus may use the uplink data (initial transmission) received at S204 and the uplink data (retransmission) received at S206 to perform the detection processing (Chase combining).

As illustrated in FIG. 2 and FIG. 3, the communication system according to the present embodiment can configure the uplink data transmitted in the retransmission to be different between the uplink data transmitted based on the scheduling grant and the grant-free transmission uplink data. To be more specific, the grant-free transmission uplink data can be retransmitted by use of a non-adaptive retransmission scheme (that is a scheme not changing a coding rate and a modulation scheme for the uplink data between the initial transmission and the retransmission), and the uplink data transmitted based on the scheduling grant can be retransmitted by use of an adaptive retransmission scheme (that is a scheme capable of changing a coding rate and a modulation scheme for the uplink data between the initial transmission and the retransmission).

Figure 4:
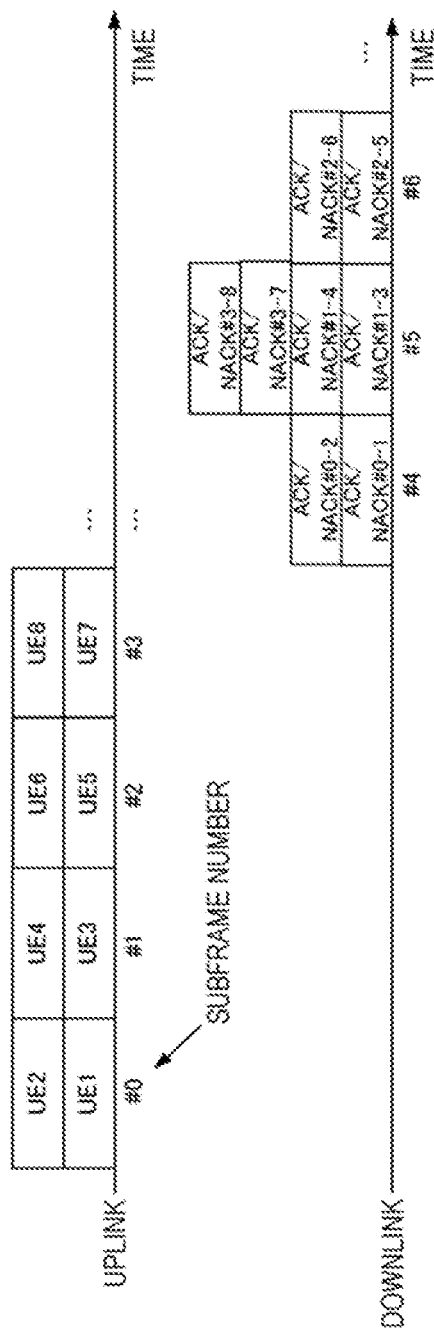
FIG. 4 is a diagram illustrating an example of ACK/NACK transmission for an uplink data transmission for each terminal apparatus according to the first embodiment.

FIG. 4 is a diagram illustrating an example of the ACK/ NACK transmission for the uplink data transmission for each terminal apparatus according to the present embodiment. For example, the ACK/NACK transmission is used for the scheduling grant transmission. A UE 1 to a UE 5 in FIG. 4 correspond to the uplink data of the terminal apparatus 20-1 to the terminal apparatus 20-5, respectively. ACK/ NACK #m-n represents an ACK/NACK for a UE #n received in subframe #m. For example, ACK/NACK #0-1 represents an ACK/NACK for the UE 1 received in subframe #0. A subframe is a time unit to which the terminal apparatus allocates the uplink data.

Here, assume that the number of receive antennas of the base station apparatus 10 is two, and the number of transmit antennas of the terminal apparatus 20 is one. The UE 1 and the UE 2 transmit the uplink data in subframe #0 (identical frequency/identical time) in accordance with the UL Grant. The UE 3 and the UE 4 transmit the uplink data in subframe #1 in accordance with the UL Grant. The UE 5 and the UE 6 transmit the uplink data in subframe #2 in accordance with the UL Grant. The UE 3 and the UE 4 transmit the uplink data in subframe #3 in accordance with the UL Grant.

The base station apparatus 10 detects the uplink data of the terminal apparatuses received in subframes #0 to #3. The base station apparatus transmits a result of detecting the uplink data at a prescribed transmission timing with an ACK/NACK to each terminal apparatus. Note that FIG. 4 illustrates a case that the transmission timings for ACK/ NACK #3-7 and ACK/NACK #3-8 are configured to be ½ of the transmission timings for ACK/NACK #1-3 and ACK/ NACK #1-4. In FIG. 4, the embodiment is described for the case of the ACK/NACK transmission for the uplink data for each terminal apparatus using the scheduling grant, but is also applicable to the ACK/NACK transmission for the uplink data for each terminal apparatus using the grant-free.

Figure 5:
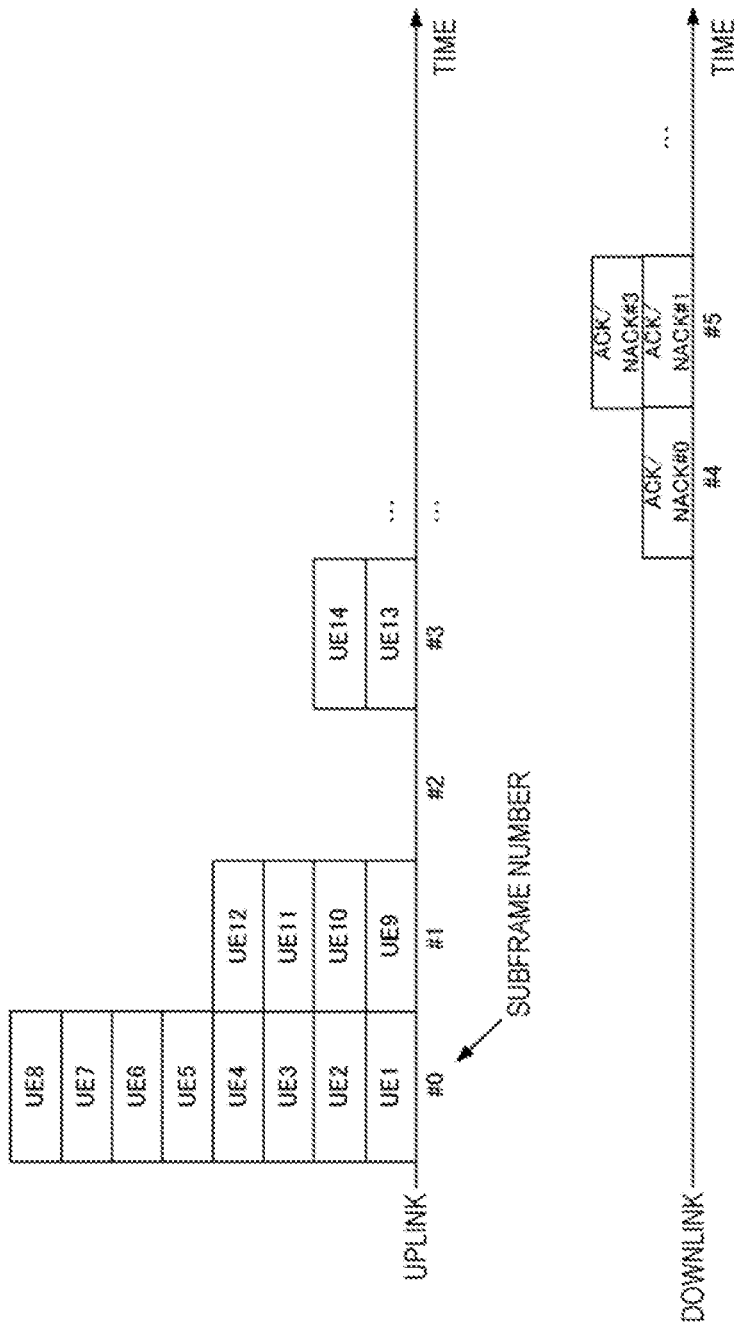
FIG. 5 is a diagram illustrating an example of bundled ACK/NACK transmission for the uplink data according to the first embodiment.

FIG. 5 is a diagram illustrating an example of bundled ACK/NACK transmission for the uplink data according to the present embodiment. For example, the ACK/NACK transmission is used for the grant-free transmission. A UE 1 to a UE 14 in FIG. 5 correspond to the uplink data of the terminal apparatus 20-1 to the terminal apparatus 20-14 in FIG. 1, respectively. Each of ACK/NACK #0 to ACK/NACK #3 is an ACK/NACK for each subframe for the uplink data in subframes #0 to #3 (bundled ACK/NACK).

Here, assume that the number of receive antennas of the base station apparatus 10 is two, and the number of transmit antennas of the terminal apparatus 20 is one. The UE 1 to the UE 8 grant-freely transmit the uplink data in subframe #0 (identical frequency/identical time). The UE 9 to the UE 12 grant-freely transmit the uplink data in subframe #1. The terminal apparatus accommodated by the base station apparatus 10 does not transmit the uplink data in subframe #2. The UE 13 to the UE 14 grant-freely transmit the uplink data in subframe #3. The base station apparatus 10 receives the uplink data in subframes #0 and #1 from the terminal apparatuses the number of which exceeds the number of receive antennas (non-orthogonal multiple access).

The base station apparatus 10 detects the uplink data of the UEs received in subframe #0. In a case that the base station apparatus successfully detects all the uplink data of the UE 1 to the UE 8, the base station apparatus transmits an ACK (transmits a bundled ACK) at a prescribed transmission timing (ACK/NACK #0) in the downlink. On the other hand, in a case that the base station apparatus fails to successfully detect even one piece of the uplink data of the UE 1 to the UE 8, the base station apparatus transmits a NACK (transmits a bundled NACK) at a prescribed transmission timing (ACK/NACK #0) in the downlink.

The base station apparatus 10 detects each piece of the uplink data received in subframe #1. In a case that the base station apparatus successfully detects all the uplink data of the UE 9 to the UE 12, the base station apparatus transmits a bundled ACK at a prescribed transmission timing (ACK/NACK #1) in the downlink. On the other hand, in a case that the base station apparatus fails to successfully detect even one piece of the uplink data of the UE 9 to the UE 12, the base station apparatus transmits a bundled NACK at a prescribed transmission timing (ACK/NACK #1) in the downlink. The base station apparatus 10 does not detect an identification signal/uplink data in subframe #2, and therefore, does not transmit an ACK/NACK.

The base station apparatus 10 detects each piece of the uplink data received in subframe #3. In a case that the base station apparatus successfully detects all the uplink data of the UE 13 to the UE 14, the base station apparatus transmits a bundled ACK at a prescribed transmission timing (ACK/NACK #3) in the downlink. On the other hand, in a case that the base station apparatus fails to successfully detect even one piece of the uplink data of the UE 13 to the UE 14, the base station apparatus transmits a bundled NACK at a prescribed transmission timing (ACK/NACK #3) in the downlink. Note that FIG. 5 illustrates a case that the transmission timing for ACK/NACK #3 is configured to be ½ of the transmission timing for ACK/NACK #1.

The communication system according to the present embodiment may also apply the method in which the uplink data received in a prescribed time unit is grouped and a bundled ACK/NACK is transmitted for each group, to the uplink data transmission using the scheduling grant. The bundled ACK/NACK transmission may be applied to the case that the grant-free transmission uplink data and the uplink data transmitted based on the scheduling grant are transmitted on the overlapping time resource and frequency resource. For example, in FIG. 5, in a case that the UE 1 and the UE 2 are the uplink data transmitted based on the scheduling grant and the UE 3 to the UE 8 are the grant-free transmission uplink data, the base station apparatus transmits a bundled ACK/NACK in subframe #0.

In an aspect of the present invention, the grant-free multiple access groups the terminal apparatuses having transmitted the uplink data multiplexed in a prescribed time unit into one terminal apparatus group. The base station apparatus transmits a bundled ACK/NACK to the group. This can suppress the downlink radio resource being tightened caused by an increase in the number of ACK/NACK transmissions in the grant-free multiple access accommodating a large number of terminal apparatuses. A NACK for the grant-free transmission uplink data makes any identification error of the terminal apparatus or detection error of the uplink data be expected. For this reason, the bundled ACK/NACK is used to enable the base station apparatus and the terminal apparatus to efficiently perform the retransmission control in the grant-free multiple access in which the base station apparatus cannot schedule in advance the resource on which the uplink data is transmitted.

Next, a description is given of an aspect of a retransmission timing of the uplink data (at S206 in FIG. 3). The base station apparatus transmits information indicating a retransmission timing of the uplink data to the terminal apparatus in the system information/RRC message/downlink control information (at S203 in FIG. 3). The base station apparatus can transmit the information indicating a retransmission timing to the terminal apparatus by using the physical retransmission request indicator channel (at S205 in FIG. 3). For example, the information indicating a retransmission timing is configured with a transmission interval (subframe interval, slot interval, frame interval) based on an uplink data transmission time at S204 as a reference (e.g., a subframe edge to which the physical uplink shared channel is allocated). The information indicating a retransmission timing may be configured with the transmission interval (subframe interval, slot interval, frame interval), based on the ACK/NACK transmission time at S205 as a reference (e.g., a subframe edge to which the physical retransmission request indicator channel is allocated).

The information indicating a retransmission timing of the uplink data can be a retransmission timing group including multiple transmission intervals (e.g., transmission intervals={1, 2, 4, 8, . . . } ms). The terminal apparatus receiving the NACK at S205 selects any transmission interval in the retransmission timing group. The terminal apparatus retransmits the uplink data at the selected retransmission interval (S206).

As another aspect, the information indicating a retransmission timing of the uplink data is configured with a reference time and an offset value for the reference time. For example, the reference time/offset value for the reference time is notified to the terminal apparatus in the system information/RRC message/downlink control information/physical retransmission request indicator channel. The base station apparatus may transmit the reference time and the offset value for the reference time on the same channel or different channels. For example, the reference time is transmitted in the system information/RRC message, and the offset value is transmitted in the downlink control information/physical retransmission request indicator channel. A channel reference time/offset value for the reference time may be constituted by retransmission timing group including multiple transmission intervals (e.g., reference times={4, 8, 12 . . . } ms, offset values={−2, −1, 0, 1, 2, 4, 8, . . . } ms).

Here, assume that the base station apparatus transmits, to the terminal apparatus, a reference time=4 ms, offset values={-2, -1, 0, 1, 2, 4, 8, . . . } ms as the retransmission timing group. The terminal apparatus receiving the NACK selects any of the offset values. The terminal apparatus retransmits the uplink data at a retransmission interval obtained from the reference time+the selected offset value (S206). The offset value may be selected by the terminal apparatus at random, or may be selected according to indication by the base station apparatus.

For example, the base station apparatus notifies each terminal apparatus of the retransmission timing group (transmission interval/reference time and offset value) in the RRC message or the like. The transmission interval/reference time an offset value may be linked to the retransmission timing index. In this case, the base station apparatus notifies each terminal apparatus of the retransmission timing index.

In the case of the configuration in which the transmission interval/offset value is selected at random, the terminal apparatus receiving the NACK retransmits the uplink data, based on the transmission interval/offset value selected from the retransmission timing group.

In the case of the configuration in which the base station apparatus indicates the retransmission timing, the base station apparatus notifying the terminal apparatus of the NACK transmits one or multiple transmission intervals/offset values in the retransmission timing group to the terminal apparatus on the physical retransmission request indicator channel. The terminal apparatus receiving the transmission interval/offset value retransmits the uplink data, based on the transmission interval/offset value. The base station apparatus can notify of the transmission intervals/offset values different between the terminal apparatuses notified of the NACK. Note that the terminal apparatus receiving the retransmission timing index retransmits the uplink data, based on the transmission interval/offset value linked to the retransmission timing index.

The base station apparatus can configure different retransmission timing for each terminal apparatus. For example, the base station apparatus configures different retransmission timing group for each terminal apparatus. The base station apparatus configures different reference time and different offset value for the reference time for each terminal apparatus.

The communication system according to the present embodiment can vary the range of the retransmission timing group depending on the number of retransmissions. For example, the base station apparatus can widen the range of the retransmission timing group as the number of retransmissions increases. The base station apparatus can widen the range of the offset values as the number of retransmissions increases.

In a case that a NACK for the uplink data transmitted on the identical time resource is notified to each terminal apparatus, the base station apparatus may configure the retransmission by the terminal apparatus such that the uplink data is transmitted using the transmit power/spread code/interleaver pattern/demodulation reference signal different between the terminal apparatuses. In this case, the transmit power/spread code/interleaver pattern/demodulation reference signal are preferably maintained in the orthogonality between the terminal apparatuses retransmitting the uplink data. The physical retransmission request indicator channel can include the transmit power/spread code/interleaver pattern/demodulation reference signal.

As described above, in the grant-free multiple access, the uplink data (initial transmission) multiplexed (collided) on the identical time resource and identical frequency resource can be prevented from being multiplexed (collided) in the retransmission. Note that in a case that the base station apparatus transmits an ACK in the physical retransmission request indicator channel, the base station apparatus may include the information indicating a retransmission timing in the physical retransmission request indicator channel. With this operation, the base station apparatus can update the retransmission timing for the terminal apparatus for the sake of the uplink data (initial transmission) to be transmitted next time.

Figure 6:
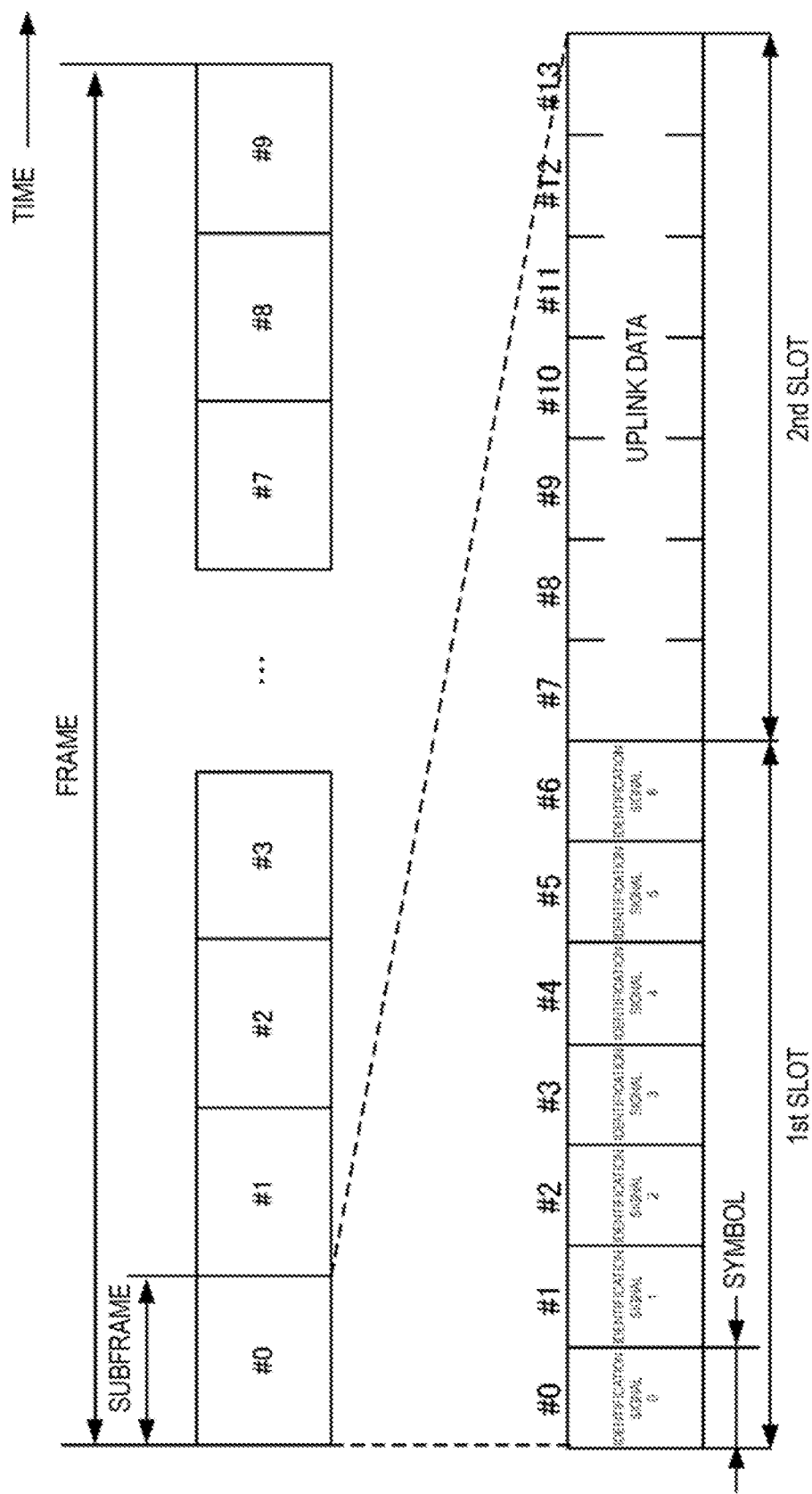
FIG. 6 is a diagram illustrating an example of an uplink radio frame format in the multiple access using the grant-free according to the first embodiment.

FIG. 6 is a diagram illustrating an example of an uplink radio frame format in the multiple access using the grant-free according to the present embodiment. In FIG. 3, the radio frame includes 10 subframes. Each subframe includes two slots. Each slot includes seven SC-FDMA symbols. Specifically, each subframe include 14 SC-FDMA symbols. In FIG. 6, the identification signals are mapped for the respective SC-FDMA symbols in a first slot. The uplink data are mapped in a second slot. For example, the uplink data of each terminal apparatus is allocated in a slot unit (the uplink data of each terminal apparatus is transmitted in the whole second slot). To be more specific, the communication system according to the present embodiment allows that the uplink data of the terminal apparatuses allocated with identification signals 0 to 6 in the first slot is non-orthogonally multiplex in the second slot.

The identification signals are used for the base station apparatus to identify (specify) the terminal apparatuses having transmitted the uplink data. The terminal apparatus can notify, by the identification signal, the base station apparatus of the uplink data having been transmitted and the resource (time resource/frequency resource) on which the uplink data has been transmitted. For the identification signal, a known sequence predefined in the base station apparatus and the terminal apparatus is used. For example, in FIG. 3, in a case that the known sequences different for each SC-FDMA symbol are allocated as the identification signals, seven terminal apparatuses can be identified. To the known sequence, predefined phase rotation, cyclic shift, interleaving, Orthogonal Cover Code (OCC), and the like may be applied. The base station apparatus can identify the terminal apparatus according to a known sequence pattern, a phase rotation pattern, a Cyclic shift pattern, an interleaver pattern, and an OCC pattern. These allow the number of identifiable terminal apparatuses to be increased.

The base station apparatus identifies which terminal apparatus has transmitted the uplink data in the first slot. For example, the base station apparatus performs identification processing by use of correlation processing using an identification signal sequence in each symbol. Each terminal apparatus is associated with the identification signal sequence (e.g., notified in the radio resource configuration information at S203 in FIG. 3). In a case that the base station apparatus determines that the terminal apparatus having transmitted the uplink data exists, the base station apparatus performs the detection processing of the uplink data of the terminal apparatus in the second slot. The uplink data can be associated with the identification signal. For example, the CRC scrambled (in other words, exclusive-ORed or masked) with the identification signal is added to the uplink data. Note that a reference signal can be mapped to any SC-FDMA symbol in each subframe. The reference signal may be obtained by multiplying a basic known sequence by any of the identification signals. The base station apparatus uses the reference signal to perform the channel estimation between the base station apparatus and the transmission terminal apparatus. The base station apparatus can use the channel estimation to perform the signal detection by the turbo equalization of the uplink data or the like.

Figure 7:
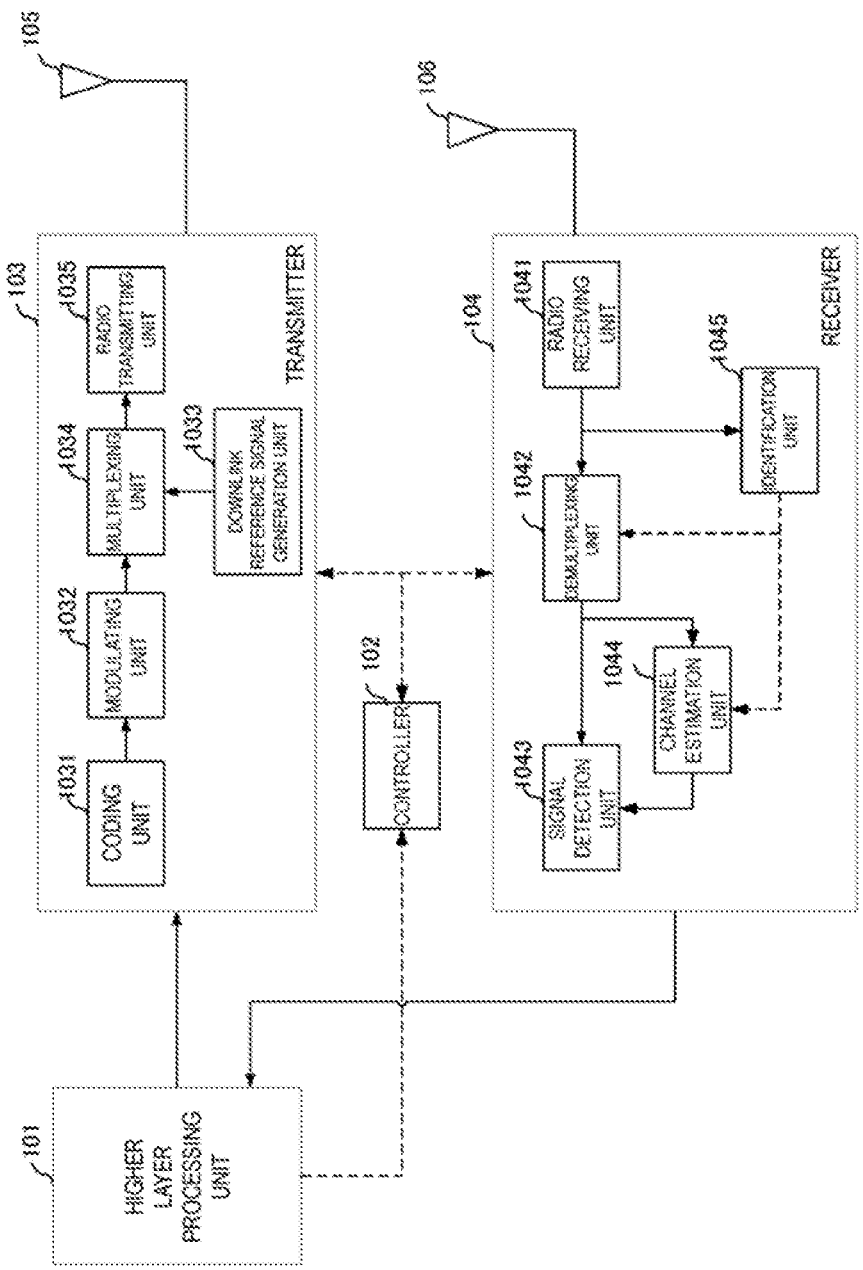
FIG. 7 is a schematic block diagram illustrating a configuration of the base station apparatus according to the first embodiment.

FIG. 7 is a schematic block diagram illustrating a configuration of the base station apparatus 10 according to the present embodiment. The base station apparatus 10 is configured to include a higher layer processing unit (higher layer processing step) 101, a controller (controlling step) 102, a transmitter (transmitting step) 103, a receiver (receiving step) 104, a transmit antenna 105, and a receive antenna 106. The transmitter 103 generates a transmit signal (physical downlink channel) to the terminal apparatus 20 depending on a logical channel input from the higher layer processing unit 101. The transmitter 103 is configured to include a coding unit (coding step) 1031, a modulating unit (modulating step) 1032, a downlink reference signal generation unit (downlink reference signal generating step) 1033, a multiplexing unit (multiplexing step) 1034, and a radio transmitting unit (radio transmitting step) 1035. The receiver 104 detects the physical uplink channel and inputs its content to the higher layer processing unit 101. The receiver 104 is configured to include a radio receiving unit (radio receiving step) 1041, a demultiplexing unit (demultiplexing step) 1042, a signal detection unit (signal detecting step) 1043, a channel estimation unit (channel estimating step) 1044, and an identification unit (identifying step) 1045.

The higher layer processing unit 101 performs processing of a layer higher than physical layers such as a Medium Access Control (MAC) layer, a Packet Data Convergence Protocol (PDCP) layer, a Radio Link Control (RLC) layer, and a Radio Resource Control (RRC) layer. The higher layer processing unit 101 generates information necessary for control of the transmitter 103 and the receiver 104, and outputs the generated information to the controller 102. The higher layer processing unit 101 outputs the uplink data (e.g., DL-SCH), broadcast information (e.g., BCH), a Hybrid Automatic Request indicator (HARQ indicator), and the like to the transmitter 103.

The higher layer processing unit 101 receives information of the terminal apparatus, such as the UE capability or the like, from the terminal apparatus 20 (via the receiver 104). The terminal apparatus transmits a function of the terminal apparatus itself to the base station apparatus by higher layer signaling. The information of the terminal apparatus includes information indicating whether the terminal apparatus supports a prescribed function, or information indicating that the terminal apparatus has completed the introduction and test of a prescribed function. The information of whether the prescribed function is supported includes information of whether the introduction and test of the prescribed function have been completed.

For example, in a case that the terminal apparatus supports a prescribed function, the terminal apparatus transmits information (parameters) indicating whether the prescribed function is supported. In a case that the terminal apparatus does not support a prescribed function, the terminal apparatus may not transmit information (parameters) indicating whether the prescribed function is supported. In other words, whether the prescribed function is supported is reported by whether information (parameters) indicating whether the prescribed function is supported is transmitted. Note that the information (parameters) indicating whether a prescribed function is supported may be reported using one bit of 1 or 0.

The information about a terminal apparatus includes information indicating that the grant-free transmission (grant-free communication) is supported. In a case that multiple functions corresponding to the grant-free transmission are present, the terminal apparatus can transmit information indicating whether the functions are supported on a function-by-function basis. The functions corresponding to the grant-free transmission includes some or all of capability to correspond to multiple tables indicating antenna ports, scrambling identities and the number of layers, capability to correspond to a prescribed number of antenna ports, and capability to correspond to a prescribed transmission mode. The transmission mode is defined depending on the number of antenna ports, transmission diversity, the number of layers, grant-free transmission support, and the like. The capability to correspond to a prescribed transmission mode can include capability to correspond to the grant-free transmission in a FDD format, capability to correspond to the grant-free transmission in a TDD format, and the like, for example. For example, in a case that multiple FDD/TDD formats are present, the terminal apparatus can also transmit information indicating which FDD/TDD format is supported as the information of the terminal apparatus.

The higher layer processing unit 101 acquires a result of detection of the physical uplink shared channel (decoded uplink data (also including a CRC)) from the receiver 104. The higher layer processing unit 101 performs error detection on the uplink data transmitted by each terminal apparatus, based on the above detection. For example, the error detection is performed in the MAC layer.

The higher layer processing unit 101 generates a HARQ indicator (bit sequence indicating an ACK/NACK), based on the error detection result. The HARQ indicator for the uplink data is output for each terminal apparatus (FIG. 4)/for each subframe (FIG. 5). The higher layer processing unit 101 outputs the HARQ indicator to the transmitter 103. For example, a single bit "1" is output in a case of an ACK, or a single bit "0" is output in a case of a NACK. The HARQ indicator is used to generate the physical retransmission request indicator channel.

The higher layer processing unit 101 generates or acquires from a higher node the system control information to be broadcasted. The higher layer processing unit 101 outputs the system control information to be broadcasted to the transmitter 103. The system control information to be broadcasted can include the information indicating that the base station apparatus supports the grant-free transmission. The system control information to be broadcasted is allocated on the physical broadcast channel/physical downlink shared channel in the transmitter 103.

The higher layer processing unit 101 generates, or acquires from a higher node, the downlink data (transport block), system information (System Information Block (SIB)), RRC message, MAC CE and the like which are allocated on the physical downlink shared channel, and outputs the generated or acquired resultant to the transmitter 103. The higher layer processing unit 101 can include parameters indicating setup or release of the grant-free transmission in the higher layer signaling. The higher layer processing unit 101 manages various pieces of configuration information of the terminal apparatus 20. The various pieces of configuration information can include the parameters indicating the setup or release of the grant-free transmission.

The higher layer processing unit 101 can also determine allocation of the identification signal to each of the terminal apparatuses supporting the grant-free transmission. The higher layer processing unit 101 can include information about an allocation of the identification signal to each terminal apparatus in the RRC message. The information about an allocation of the identification signal can include parameters required for generating the identification signal sequence (the phase rotation, cyclic shift, interleaving, OCC, or the like by which identification signal is multiplied). The higher layer processing unit 101 outputs the information about an allocation of the identification signal to the controller 102/transmitter 103. Note that some of the functions of the radio resource control may be performed in a MAC layer or physical layer.

The higher layer processing unit 101 configures the Cell Radio Network Temporary Identifier (C-RNTI) for each terminal apparatus. The cell radio network temporary identifier includes an identifier unique to the grant-free transmission. The identifier is used to encrypt (scramble) the downlink control channel, the downlink data channel, and the physical retransmission request indicator channel. The identifier can be used for a sequence by which the physical retransmission request indicator channel is multiplied. The identifier can be used to encrypt (scramble) the identification signal, the uplink data channel, and the uplink control channel. The higher layer processing unit 101 outputs the configuration information about a identifier to the controller 102/transmitter 103/receiver 104.

The higher layer processing unit 101 determines the coding rate, modulation scheme (or MCS), and transmit power (a power ratio between the identification signal and the physical uplink shared channel, a power ratio between the reference signal and the identification signal, or the like) of the physical channel (physical downlink shared channel, physical uplink shared channel). The higher layer processing unit 101 outputs the coding rate/modulation scheme/transmit power ratio to the controller 102/transmitter 103/receiver 104. The higher layer processing unit 101 can include the coding rate/modulation scheme/transmit power ratio in the higher layer signaling.

Based on the various pieces of configuration information input from the higher layer processing unit 101, the controller 102 generates a control signal for controlling of the transmitter 103 and the receiver 104. The controller 102 generates the downlink control information (DCI) based on the information input from the higher layer processing unit 101, and outputs the generated information to the transmitter 103. The controller 102 can include the information about a uplink data retransmission in the downlink control information. Note that in the case of the data transmission using the scheduling grant, the downlink control information includes a resource allocation field of the physical downlink shared channel/physical uplink shared channel.

A Cyclic Redundancy Check (CRC) is generated for a control data sequence of the generated DCI format. The CRC is encrypted (scrambled) with the identifier (e.g., Cell-Radio Network Temporary Identifier (C-RNTI)). For the identifier, an identifier unique to the grant-free transmission can be used. The encrypted CRC is added to the DCI format. The signal generated as the DCI format is allocated on the PDCCH. Note that the function of the controller 102 can be included in the higher layer processing unit 101.

The transmitter 103 generates a downlink reference signal in accordance with the control signal input from the controller 102. The transmitter 103 codes or modulates, for the terminal apparatus, the broadcast information, downlink control information, downlink data, HARQ indicator and the like which are input from the higher layer processing unit 101 to generate the physical broadcast channel, the physical retransmission request indicator channel, the physical downlink control channel, and the physical downlink shared channel. The transmitter 103 multiplexes the physical broadcast channel, the physical retransmission request indicator channel, the physical downlink control channel, the physical downlink shared channel, and the downlink reference signal, and transmits the multiplexing result to the terminal apparatus via the transmit and/or receive antenna 105.

The coding unit 1031 codes (including repetition) the broadcast information, downlink control information, downlink data, and HARQ indicator which are input from the higher layer processing unit 101 in accordance with block coding, convolutional coding, turbo coding, and the like by use of a predefined coding scheme/coding scheme determined by the higher layer processing unit 101. The modulating unit 1032 modulates the coded bits input from the coding unit 1031, in compliance with a predefined modulation scheme/modulation scheme determined by the higher layer processing unit 101, such as Binary Phase Shift Keying (BPSK), quadrature Phase Shift Keying (QPSK), quadrature amplitude modulation (16QAM), 64QAM, or 256QAM.

The downlink reference signal generation unit 1033 generates a sequence known by the terminal apparatus as a downlink reference signal. The known sequence is found in accordance with a rule predefined based on a physical cell identifier for identifying the base station apparatus 10.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements. The multiplexing unit 1034 maps an output signal from the modulating unit 1032 to the resource on which the physical retransmission request indicator channel is transmitted based on the configured frequency resource and time resource (a transmission timing of an ACK/NACK). Note that the HARQ indicator/information about an uplink data retransmission including the HARQ indicator may be one piece of the downlink control information. In this case, a unique DCI format may be defined for notifying of the HARQ indicator/information about an uplink data retransmission including the HARQ indicator.

The radio transmitting unit 1035 performs Inverse Fast Fourier Transform (IFFT) on the multiplexed modulation symbols and the like to generate an OFDM symbol. The radio transmitting unit 1035 adds a cyclic prefix (CP) to the OFDM symbol to generate a baseband digital signal. Furthermore, the radio transmitting unit 1035 converts the digital signal into an analog signal, removes unnecessary frequency components through filtering, up-converts a result of the removal into a signal of a carrier frequency, performs power amplification, and outputs a final resultant to the transmit 105 for transmission.

Here, a description is given of an example of generating the physical retransmission request indicator channel for the uplink data grant-freely transmitted.

First, the higher layer processing unit 101 inputs a HARQ indicator an (delivery confirmation, ACK/NACK) to the transmitter 103 (e.g., $a_n$="0" in the case of a NACK, and $a_n$="1" in the case of an ACK). The index n depends on a unit for transmitting the HARQ indicator. In the case that an ACK/NACK is transmitted for each terminal apparatus, n represents an ACK/NACK for the uplink data of the terminal apparatus 20-$n$. In the case that a bundled ACK/NACK is transmitted for each subframe, n represents an ACK/NACK for the uplink data transmitted in the subframe n.

A description is given of an example of generating the physical retransmission request indicator channel transmitting multiple ACKs/NACKs by multiplying a spread code sequence. The code unit 1031 may perform repetition on the HARQ indicator. For example, in a case that repetition is performed three times, a NACK "0" and an ACK "1" are repeated to be "000" and "111", respectively. The modulating unit 1032 performs data modulation (e.g., BPSK modulation) on output data from the code unit 1031. Furthermore, the modulating unit 1032 multiplies data after the data modulation by a prescribed sequence (spread sequence) (data after the data modulation is spread by a prescribed sequence). For the sequence, an orthogonal sequence (or quasi-orthogonal sequence) can be used. The sequence can be associated with the identifier unique to the grant-free transmission. For example, the identifier unique to the grant-free transmission is used as a generation parameter for the orthogonal sequence. For example, the orthogonal sequence is cyclic shifted based on the identifier unique to the grant-free transmission. Furthermore, the multiplexing unit 1034 maps an output signal from the modulating unit 1032 to the resource on which the physical retransmission request indicator channel is transmitted, based on the configured frequency resource and time resource (a transmission timing of an ACK/NACK). The multiplexing unit 1034 can code-multiplex the multiple physical retransmission request indicator channel on the identical frequency resource and time resource.

As another aspect, a description is given of the case that the physical retransmission request indicator channel is generated by adding a CRC. The higher layer processing unit 101 adds CRC parity bits to a bit sequence of the information about a uplink data retransmission including a HARQ indicator. The higher layer processing unit 101 may add the CRC parity bits to the information about a uplink data retransmission including multiple HARQ indicators. The bit sequence after adding the CRC is represented as "$x_0$, $x_1$, ... $x_{q-1}$, $p_0$, $p_1$, ... $p_{r-1}$" (x is the bit sequence of the HARQ indicator, p is the CRC parity bits sequence, q is the total number of bits of the ACK/NACK, and r is the number of CRC parity bits).

The CRC parity bits are added to multiple ACKs/NACKs for an identical transmission timing. In FIG. 5, the CRC parity bits are added to an ACK/NACK bit (each is one bit) of ACK/NACK #1 and ACK/NACK #3 transmitted in subframe #5, and the bit sequence of the information about an uplink data retransmission for ACK/NACK #1 and ACK/NACK #3. The higher layer processing unit 101 scrambles (masks) the CRC parity bits with the identifier unique to the grant-free transmission.

For example, the base station apparatus can configure a bit sequence length of the HARQ indicator x (or, the number of ACK/NACK storage fields), based on the number of uplink subframes. In the bundled ACK/NACK transmission, the bit sequence length q of the HARQ indicator x=the number m of subframes×the number L of bits of the HARQ indicator. In a case that the number m of subframes=10, the bit sequence after adding the CRC is "$x_0$, $x_1$, $x_2$, $x_3$, ..., $x_{q-1}$, $p_0$, $q_1$, ... $q_{r-1}$" becomes "$a_0$, $a_1$, $a_2$, $a_3$, ..., $a_9$, $p_0$, $q_1$, ... $q_{r-1}$". Here, $a_m$ (m is a transmission subframe number for the uplink data) represents an ACK/NACK bit (HARQ indicator bit) for the uplink data. In this case, the HARQ indicator x has 10 ACK/NACK fields each of which includes one bit. In the ACK/NACK transmission in subframe #5 in FIG. 5, ACK/NACK #1 is stored in "$a_1$". ACK/NACK #3 is stored in "$a_3$". Each of other bits (other than $a_1$, $a_3$) may store a dummy bit. In this case, the terminal apparatus acquires the ACK/NACK for the uplink data, based on the subframe number that the uplink data has been transmitted. Note that the base station apparatus can also notify the terminal apparatus of an ACK/NACK storage field index for each piece of the uplink data by using the RRC message/downlink control channel and the like.

The higher layer processing unit 101 scrambles (masks) the above CRC parity bits "$p_0$, $p_1$, ... $p_{r-1}$" with the parameter shared by the multiplexed terminal apparatuses such as a sequence associated with the identifier unique to the grant-free transmission. For example, in FIG. 5, in a case that a CRC parity bit length=16 bits, the sequence associated with the identifier unique to the grant-free transmission=1+ the subframe number that the ACK/NACK is transmitted, the CRC parity bits of the ACK/NACK transmitted in subframe #5 is scrambled with a sequence "0000000000000110".

The code unit 1031 performs error correction coding (including rate matching) on the bit sequence of multiple ACKs/NACKs to which the CRC parity bits are added. The modulating unit 1032 performs the data modulation on the output signal from the code unit 1031. The multiplexing unit 1034 maps the output signal from the modulating unit 1032 to the resource on which the physical retransmission request indicator channel is transmitted, based on the configured frequency resource and time resource (the transmission timing of the ACK/NACK). Note that the output data from the modulating unit 1032 may be further scrambled. This scramble pattern may be associated with the identifier unique to the grant-free transmission. In the communication system according to the present embodiment, the grant-free transmission/scheduling grant-based transmission may use both physical retransmission request indicator channels generated by two aspects described above.

As describe above, the ACK/NACK for the uplink data in the grant-free transmission is associated with the identifier unique to the grant-free transmission generated using the parameter shared by the multiplexed terminal apparatuses or the spread sequence (orthogonal sequence or quasi-orthogonal sequence). On the other hand, the ACK/NACK for the uplink data transmitted based on the scheduling grant is associated with the spread sequence generated using a terminal apparatus-specific identifier or a terminal apparatus-specific parameter. The terminal apparatus-specific identifier includes a C-RNTI assigned to each terminal apparatus, or the like. The terminal apparatus-specific parameter includes a cyclic shift for a DMRS, an OCC, or the like.

In accordance with the control signal input from the controller 102, the receiver 104 detects (demultiplexes, demodulates, and decodes) the reception signal from the terminal apparatus 20 through the receive antenna 106, and outputs information resulting from the decoding to the higher layer processing unit 101. The controller 102 acquires a result of identifying the terminal apparatus (such as an identifier applied to the identified terminal apparatus) from the identification unit 1045, and outputs the acquired result to the higher layer processing unit 101. The controller 102 acquires information about a uplink data retransmission to the identified terminal apparatus. The controller 102 controls the transmitter 103 based on the information about a uplink data retransmission.

The radio receiving unit 1041 converts, by down-converting, an uplink signal received through the receive antenna 106 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 1041 removes a portion corresponding to the CP from the digital signal resulting from the conversion. The radio receiving unit 1041 performs Fast Fourier Transform (FFT) on the signal from which the CP has been removed, and extracts a signal in the frequency domain. The signal in the frequency domain is output to the demultiplexing unit 1042. Furthermore, the radio receiving unit 1041 outputs the signal from which the CP has been removed to the identification unit 1045.

The identification unit 1045 extracts an identification signal from the reception signal. The identification unit 1045 uses the identification signal to identify (specify) the terminal apparatus having grant-freely transmitted the uplink data. The identification unit 1045 outputs information about the transmission terminal apparatus to the channel estimation unit 1044 and the demultiplexing unit 1042. For example, the identification of the transmission terminal apparatus is made by blind detection by using the correlation processing of the identification signal sequence held by the base station apparatus 10 and the extracted identification signal sequence.

The demultiplexing unit 1042 demultiplexes the signal input from the radio receiving unit 1041 into signals such as the uplink data channel and uplink control channel. The demultiplexing unit 1042 uses the information about a transmission terminal apparatus (such as uplink data channel allocation information associated with the identification signal) identified by the identification unit 1045 to demultiplex the frequency domain signal into the uplink data channel, the uplink control channel, and the reference signal. The demultiplexed reference signal is input to the channel estimation unit 1044. The demultiplexed uplink data channel and uplink control channel are output to the signal detection unit 1043. Note that in a case of the uplink data transmission using the scheduling grant, the demultiplexing unit 1042 performs the signal demultiplexing based on radio resource allocation information that is determined in advance by the base station apparatus 10 using the higher layer processing unit 101 and that is included in the uplink grant notified to each terminal apparatus 20.

The reference signal which is time-multiplexed with the data signal and transmitted (e.g., DMRS), and the information of the identified transmission terminal apparatus are input to the channel estimation unit 1044. The channel estimation unit 1044 uses the reference signal to estimate a frequency response, and outputs a frequency response estimated for demodulation to the signal detection unit 1043. In a case the Sounding Reference Signal (SRS) is input to the channel estimation unit 1044, the channel estimation unit 1044 can estimate a frequency response used for uplink scheduling. Note that the channel estimation unit 1044 can also use the identification signal for the channel estimation.

Figure 8:
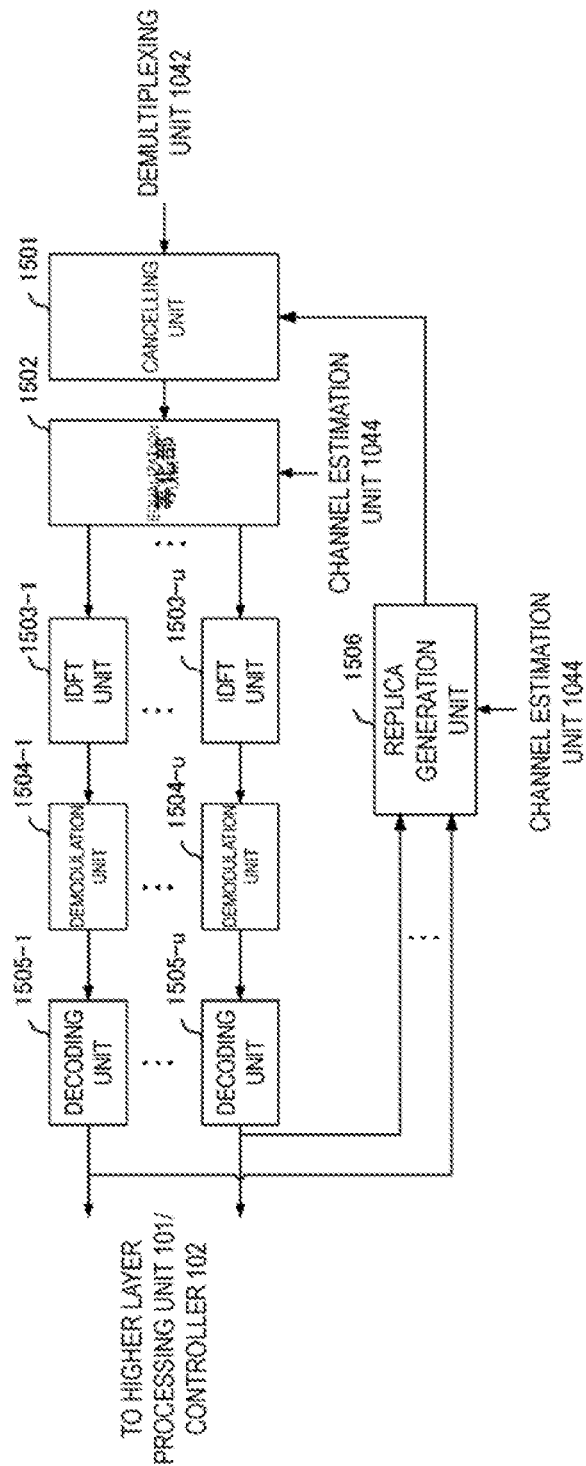
FIG. 8 is a diagram illustrating an example of signal detection unit according to the first embodiment.

FIG. 8 is a diagram illustrating an example of the signal detection unit according to the present embodiment. The signal detection unit 1043 includes a cancelling unit 1501, an equalization unit 1502, IDFT units 1503-1 to 1503-$u$, demodulation units 1504-1 to 1504-$u$, decoding units 1505-1 to 1505-$u$, and a replica generation unit 1506 ($1<u<U$, U is the number of terminal apparatuses which are identified by the identification unit 1045 and non-orthogonally multiplexed/orthogonal multiplexed at the identical time and the identical frequency). In the signal detection unit 1043, the reception signal of each terminal apparatus extracted by the demultiplexing unit 1042 is input to the cancelling unit 1501. The cancelling unit 1501 uses a soft replica input from the replica generation unit 1506 to perform cancel processing on each reception signal. The equalization unit 1502 generates equalization weights based on an MMSE rule by using the frequency response input from the channel estimation unit 1044. Note that the equalization unit 1502 can also use a frequency response calculated from the identification signal in generating the equalization weights.

The equalization unit 1502 multiplies the equalization weight by the signal after soft cancelling (the signal input from the cancelling unit 1501). The equalization unit 1502 outputs the signal for each terminal apparatus after the equalization to the IDFT units 1503-1 to 1503-$u$. Each of the IDFT units 1503-1 to 1503-$u$ transforms the reception signal after the equalization in the frequency domain into a time domain signal. Note that in a case that the terminal apparatus has performed the cyclic shift, the phase rotation, or the interleaving before or after the DFT in the transmission processing, processing for restoring from the cyclic shift, the phase rotation, or the interleaving is performed on the reception signal after the equalization in the frequency domain or the time domain signal. Each of the demodulation units 1504-1 to 1504-$u$ receives information of a modulation scheme which is predefined or a notified in advance, although not illustrated. Each of the demodulation units 1504-1 to 1504-$u$ performs demodulation processing on the time domain signal, based on the information of the modulation scheme, and outputs a bit sequence Log Likelihood Ratio (LLR).

Each of the decoding units 1505-1 to 1505-$u$ receives information of a coding rate which is notified in advance or predefined, although not illustrated. Each of the decoding units 1505-1 to 1505-$u$ performs decoding processing on the LLR sequence output from the demodulation unit. In order to perform the cancel processing of the Successive Interference Canceller (SIC), the turbo equalization, and the like, each of the decoding units 1505-1 to 1505-$u$ outputs an external LLR or a posteriori LLR of the decoding unit output to the replica generation units 1506. A difference between the external LLR and the posteriori LLR is whether to subtract a priori LLR input to each of the decoding units 1505-1 to 1505-$u$ from a decoded LLR. Note that in a case that the terminal apparatus applies, on a coded bit sequence after the error correction coding, puncturing (culling), the interleaving, or the scrambling in the transmission processing, the signal detection unit 1043 applies, on the LLR sequence input to each of the decoding units 1505-1 to 1505-$u$, depuncturing (inserting 0 into a culled bit LLR), deinterleaving (restoring from rearrangement), or descrambling.

The replica generation unit 1506 generates a symbol replica from the LLR sequence input from each decoding unit in accordance with the modulation scheme used for the uplink data by each terminal apparatus. Furthermore, the replica generation unit 1506 transforms the symbol replica into a signal in the frequency domain by DFT, allocates the signal to the resource used by each terminal apparatus, and multiplies the resultant by the frequency response input from the channel estimation unit 1044 to generate a soft replica. Each of the decoding units 1505-1 to 1505-$u$ makes a hard decision on the decoded LLR sequence in a case the number of iterations of the SIC or turbo equalization reaches a prescribed number, and inputs the resultant to the higher layer processing unit 101.

The higher layer processing unit 101 determines whether or not an error bit is present from a Cyclic Redundancy Check (CRC) included in the result of the hard decision. The higher layer processing unit 101 uses the identifier with which the CRC is scrambled by the identified terminal apparatus to descramble the CRC (perform the exclusive OR operation). The higher layer processing unit 101 determines whether or not the uplink data of each terminal apparatus is successfully received from a descrambling resultant. Note that FIG. 8 illustrates the signal detection using the turbo equalization processing, but maximum likelihood detection, EMMSE-IRC, and the like can be also used.

Figure 9:
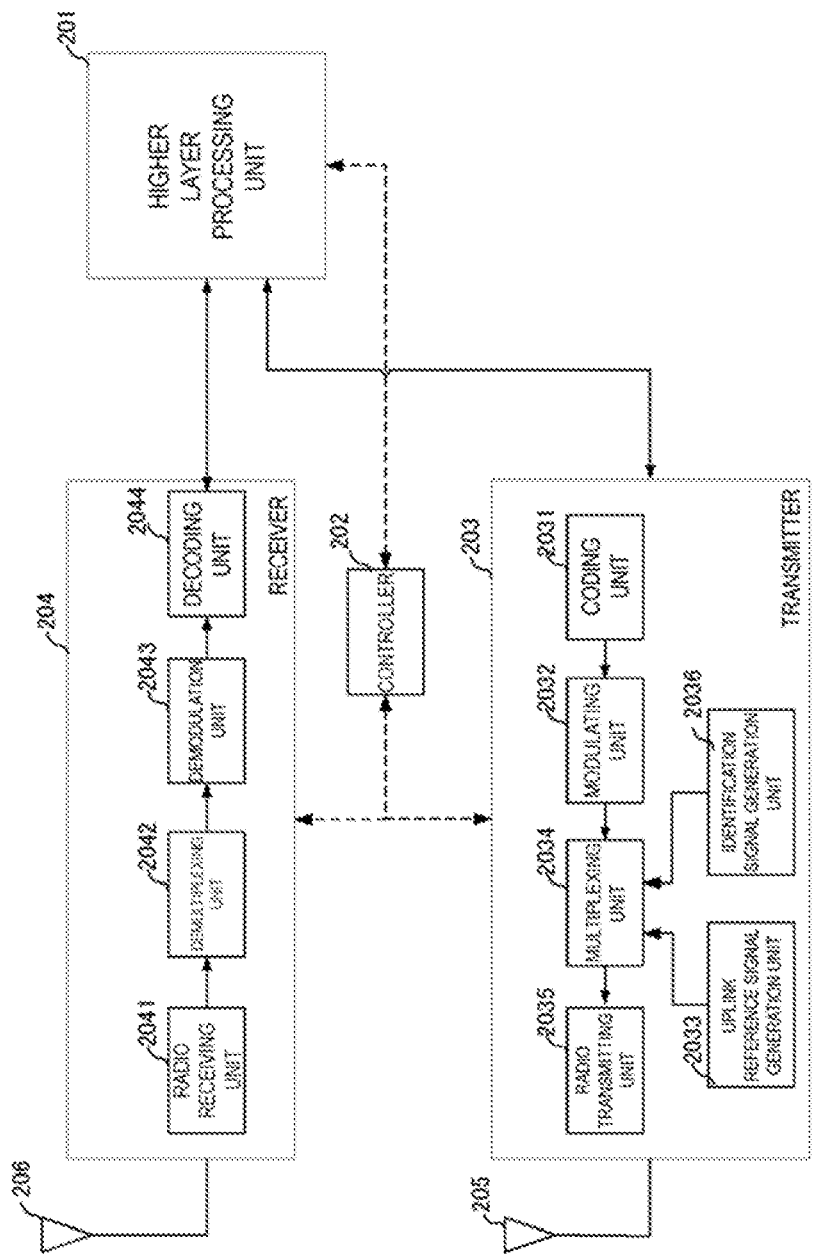
FIG. 9 is a schematic block diagram illustrating a configuration of the terminal apparatus according to the first embodiment.

FIG. 9 is a schematic block diagram illustrating a configuration of the terminal apparatus 20 according to the present embodiment. The terminal apparatus 20 is configured to include a higher layer processing unit (higher layer processing step) 201, a controller (controlling step) 202, a transmitter (transmitting step) 203, a receiver (receiving step) 204, a transmit antenna 205, and a receive antenna 206. The transmitter 203 is configured to include a coding unit (coding step) 2031, a modulating unit (modulating step) 2032, an uplink reference signal generation unit (uplink reference signal generating step) 2033, a multiplexing unit (multiplexing step) 2034, a radio transmitting unit (radio transmitting step) 2035, and an identification signal generation unit 2036. The receiver 204 is configured to include a radio receiving unit (radio receiving step) 2041, a demultiplexing unit (demultiplexing step) 2042, a demodulation unit (demodulating step) 2043, and a decoding unit (decoding step) 2044.

The higher layer processing unit 201 performs processing of a medium access control (MAC) layer, a packet data convergence protocol (PDCP) layer, a radio link control (RLC) layer, and a radio resource control (RRC) layer. The higher layer processing unit 201 outputs, to the transmitter 203, information (UE Capability) indicating a terminal apparatus function supported by the terminal apparatus itself. For example, the information indicating the terminal apparatus function supported by the terminal apparatus itself includes the information indicating the grant-free transmission is supported, and the like. In a case that multiple functions corresponding to the grant-free transmission are present, the higher layer processing unit 201 can transmit information indicating whether the functions are supported on a function-by-function basis. For example, the higher layer processing unit 201 transmits, by signaling in the RRC layer, the information indicating the terminal apparatus function supported by the terminal apparatus itself.

The higher layer processing unit 101 interprets the downlink control information (DCI) received via the receiver 204. The higher layer processing unit 101 can interpret the information about a grant-free transmission included in the downlink control information. The higher layer processing unit 101 generates control information for controlling the receiver 204 and transmitter 203 based on the information about a grant-free transmission, and outputs the generated information to the controller 202.

The higher layer processing unit 201 manages various pieces of configuration information of the terminal apparatus itself. Some of the various pieces of configuration information are input to the controller 202. Some of the various pieces of configuration information are received from the base station apparatus 10 via the receiver 204. The various pieces of configuration information include information indicating the uplink radio frame format. The various pieces of configuration information include the configuration information about a grant-free transmission received from the base station apparatus 10. The information about a grant-free transmission includes the information about an allocation of the identification signal to each terminal apparatus, configuration of the identifier unique to the grant-free transmission, the parameters indicating setup or release of the grant-free transmission, a reception timing of the ACK/NACK for the uplink data signal, a retransmission timing of the uplink data signal, and signals indicating change in the configuration information about a grant-free transmission and the identification signal. The higher layer processing unit 201 manages the radio resource on which the uplink data (transport block) is grant-freely transmitting based on the information about a grant-free transmission.

The higher layer processing unit 201 outputs the uplink data generated by a user operation or the like, to the transmitter 203. The higher layer processing unit 201 can also output the uplink data generated without the user operation (e.g., data acquired by a sensor) to the transmitter 203. The higher layer processing unit 201 adds CRC parity bits to the uplink data. The CRC parity bits are generated using the uplink data. The CRC parity bits are scrambled (in other words, exclusive-ORed or masked) with a prescribed identifier. As the identifier, a cell radio network temporary identifier may be used. The cell radio network temporary identifier may be an identifier unique to the grant-freely transmitting terminal apparatus. As the identifier, the identification signal sequence allocated to the terminal apparatus itself may be used. As the identifier, a sequence generated using a parameter for the identification signal sequence allocated to the terminal apparatus itself (a phase rotation amount, a cyclic shift amount, an OCC pattern, an interleaver pattern) may be used.

The higher layer processing unit 201 acquires an ACK/NACK (HARQ indicator) for the uplink data included in the physical retransmission request indicator channel via the receiver 204. At this time, the higher layer processing unit 201 uses the identifier with which the CRC added to the HARQ indicator is masked to perform descramble processing (exclusive OR operation). The higher layer processing unit 201, in acquiring an ACK/NACK for the uplink data, can use the subframe number that the uplink data/identification signal is transmitted or the like to specify the ACK/NACK directed to itself included in the physical retransmission request indicator channel. The higher layer processing unit 201 can also specify the ACK/NACK directed to itself based on the ACK/NACK storage field index notified by the base station apparatus.

In the case of the NACK, the higher layer processing unit 201 inputs, to the controller 202, control information for retransmitting the uplink data. The control information for the retransmission can include information indicating a retransmission timing, information indicating a frequency resource for retransmission, information indicating an identification signal for retransmission, information about Redundancy Version (RV) of the physical uplink shared channel, and the like. The controller 202 controls the transmitter 203 based on the control information for the retransmission.

The controller 202 generates the uplink control information (UCI), based on the information input from the higher layer processing unit 201, and outputs the generated information to the transmitter 203. The controller 202 can generates a Cyclic Redundancy Check (CRC) for a data sequence of a UCI format. The CRC may be encrypted (scrambled) with a Cell-Radio Network Temporary Identifier (C-RNTI). For the C-RNTI, an identifier unique to the grant-free transmission terminal can be used. The controller 202 can also encrypt the CRC with the identification signal. The encrypted CRC is added to the UCI format.

The receiver 204 demultiplexes, demodulates, and decodes the reception signal received from the base station apparatus 10 through the receive antenna 206. The receiver 204 outputs the decoded information to the higher layer processing unit 201. The radio receiving unit 2041 converts, by down-converting, a downlink signal received through the receive antenna 206 into a baseband signal, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 2041 removes a portion corresponding to the CP from the digital signal resulting from the conversion, performs fast Fourier transform on the signal from which the CP has been removed, and extracts a signal in the frequency domain.

The demultiplexing unit 2042 demultiplexes the extracted signal in the frequency domain into the downlink channel (physical retransmission request indicator channel, physical downlink control channel, physical downlink shared channel, and downlink reference signal. The demultiplexing unit 2042 compensates the downlink channel, based on the channel estimation obtained from channel measurement using the downlink reference signal. The demultiplexing unit outputs the downlink channel to the demodulation unit 2043.

The demodulation unit 2043 demodulates the reception signal for the modulation symbols of each downlink channel by using the modulation scheme predefined or notified in advance with the downlink grant, such as BPSK, QPSK, 16QAM, 64QAM, 256QAM, or the like. In a case that the physical retransmission request indicator channel is spread by the identifier/identification signal and the like, the demodulation unit 2043 performs despread processing by using the identifier before the demodulation processing.

The decoding unit 2044 decodes the coded bits of each demodulated downlink channel at a coding rate predefined or notified in advance with the downlink grant of a predefined coding scheme, and outputs the decoded downlink data, the downlink control information, and the HARQ indicator to the higher layer processing unit 201.

The transmitter 203 generates an uplink reference signal in accordance with the control signal input from the controller 202. The transmitter 203 codes and modulates the uplink data (transport block) or uplink control signal input from the higher layer processing unit 201 to generate the physical uplink control channel and the physical uplink shared channel. The physical uplink control channel is encrypted with the C-RNTI. The physical uplink control channel grant-freely transmitted may be encrypted (in other words, scrambled, exclusive-ORed, or masked) with the identification signal. The physical uplink data channel is associated with the terminal apparatus-specific identification signal or identifier.

The transmitter 203 multiplexes the physical uplink control channel, the physical uplink shared channel, and the uplink reference signal, and transmits the resultant to the base station apparatus 10 via the transmit antenna 205.

The coding unit 2031 codes the uplink control information and uplink data input from the higher layer processing unit 201 in accordance with convolutional coding, block coding, turbo coding, or the like.

The modulating unit 2032 modulates the coded bits input from the coding unit 2031, in compliance with the modulation scheme notified with the downlink control information, such as BPSK, QPSK, 16QAM, or 64QAM, or in compliance with a modulation scheme predefined for each channel.

The uplink reference signal generation unit 2033 generates a sequence acquired according to a predefined rule (formula), based on a physical cell identifier (also referred to as a physical cell identity (PCI), a Cell ID, or the like) for identifying the base station apparatus 10, a bandwidth to which the uplink reference signal is allocated, a cyclic shift, a parameter value for generation of a DMRS sequence, and the like. The uplink reference signal may be associated with the identification signal. For example, the uplink reference signal may be multiplied by the identification signal. The predefined rule (formula) may include an identification signal sequence generation parameter.

The identification signal generation unit 2036 generates a sequence obtained according to a predefined rule (formula), based on the configuration information about a grant-free transmission. For example, for the identification signal sequence, an orthogonal sequence such as a M-sequence, a Zadoff-Chu sequence, and a Hadamard sequence or quasi-orthogonal sequence (pseudo orthogonal sequence) can be used. Furthermore, the identification signal generation unit 2036 performs the phase rotation/cyclic shift/OCC/interleaving on the identification signal sequence, based on the configuration information about a grant-free transmission.

The multiplexing unit 2034 rearranges the modulation symbols of the uplink data channel in parallel and then performs Discrete Fourier Transform (DFT) on the rearranged modulation symbols. The multiplexing unit 2034 multiplexes the uplink control channel, the uplink data channel, the identification signal, and the uplink reference signal for each transmit antenna port. To be more specific, the multiplexing unit 2034 allocates the uplink control channel, the uplink data channel, the identification signal, and the uplink reference signal to the resource elements for each transmit antenna port.

The radio transmitting unit 2035 performs Inverse Fast Fourier Transform (IFFT) on the multiplexed modulation symbols, and performs modulation of SC-FDMA scheme to generate an SC-FDMA symbol. The radio transmitting unit 2035 adds a CP to the SC-FDMA symbol to generate a baseband digital signal. Furthermore, the radio transmitting unit 2035 converts the baseband digital signal into an analog signal, removes unnecessary frequency components, up-converts a result of the removal into a signal of a carrier frequency, performs power amplification, and transmits a final resultant to the base station apparatus 10 via the transmit antenna 205.

As described above, in the communication system using the grant-free multiple access according to the present embodiment, the uplink data is associated with the terminal apparatus-specific identification signal or terminal apparatus-specific identifier relating to the grant-free transmission. The ACK/NACK for the uplink data is associated with the identifier unique to the grant-free transmission generated using the parameter shared by the multiplexed terminal apparatuses. Alternatively, an ACK/NACK for each terminal apparatus or a bundled ACK/NACK is applied to the ACK/NACK for the uplink data. This enables the base station apparatus and the terminal apparatus to efficiently perform the retransmission control in the grant-free multiple access in which the base station apparatus cannot schedule in advance the resource on which the uplink data is transmitted.

Second Embodiment

The present embodiment is an example of a case that the grant-free transmission uplink data and the uplink data transmitted based on the scheduling grant are present in a combined manner. The communication system according to the present embodiment can selectively use an ACK/NACK for each terminal apparatus and a bundled ACK/NACK depending on whether the data is uplink data transmitted based on the scheduling grant or uplink data grant-freely transmitted. The communication system according to the present embodiment is configured to include the base station apparatus 10 and terminal apparatuses 20 described in FIG. 1 to FIG. 9. Hereinafter, differences from/additions to the first embodiment are mainly described.

Figure 10:
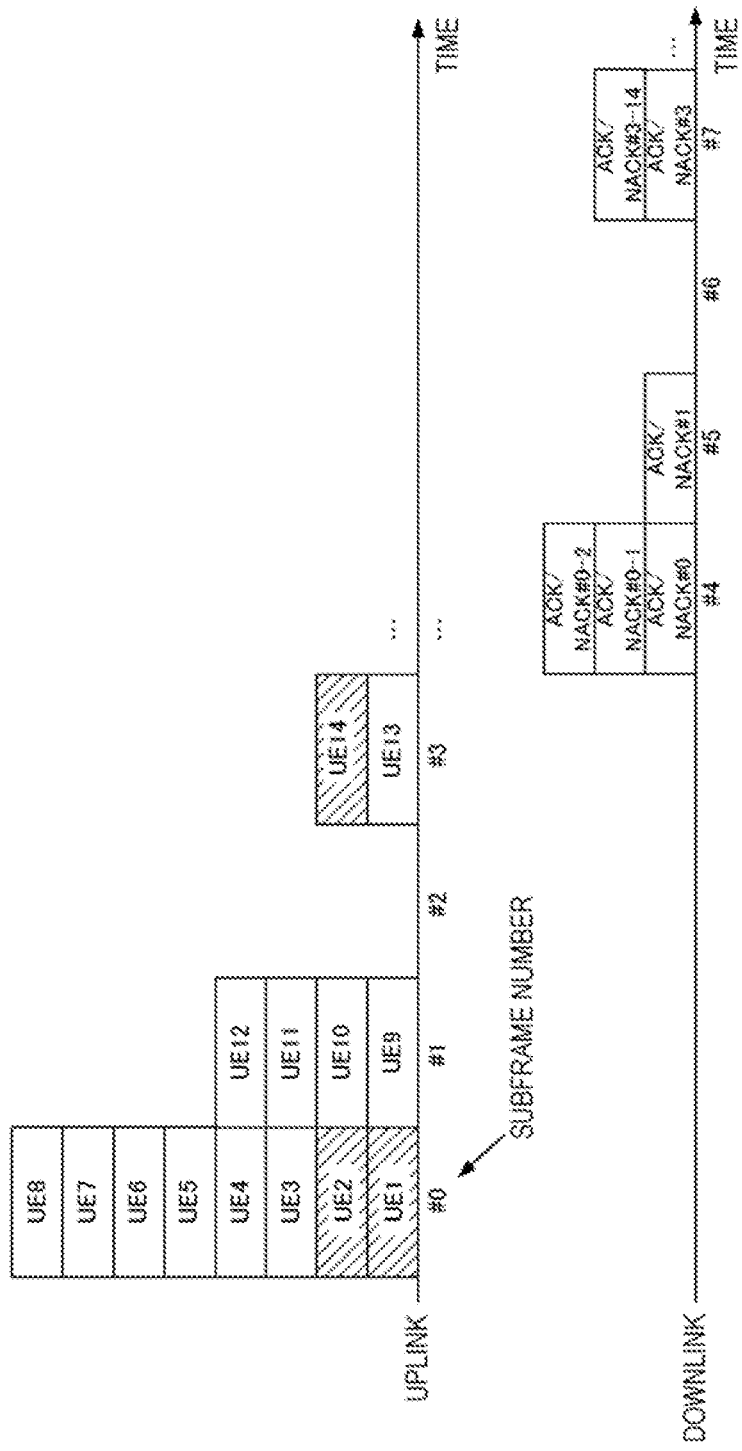
FIG. 10 is a diagram illustrating an example of ACK/NACK transmission for the uplink data according to a second embodiment.

FIG. 10 is a diagram illustrating an example of ACK/NACK transmission for the uplink data according to the present embodiment. The example is an example in which the grant-free transmission uplink data and the uplink data transmitted based on the scheduling grant are transmitted on the overlapping time resource and frequency resource. A UE 1 to a UE 14 correspond to the uplink data of the terminal apparatus 20-1 to the terminal apparatus 20-14. ACK/NACK #0 to ACK/NACK #3 are ACKs/NACKs for the uplink data in subframes #0 to #3, respectively (bundled ACK/NACK in each subframe). ACK/NACK #m-n represents an ACK/NACK for a UE #n received in subframe #m (ACK/NACK for each terminal apparatus).

Here, assume that the number of receive antennas of the base station apparatus 10 is two, and the number of transmit antennas of the terminal apparatus 20 is one. In FIG. 10, the UE 1, the UE 2, and the UE 14 are the uplink data transmitted based on the scheduling grant (hatched with lines upward to the left). The UE 3 to the UE 13 are the grant-free transmission uplink data.

The UE 1 to the UE 8 transmit the uplink data in subframe #0 (identical frequency/identical time). The UE 9 to the UE 12 transmit the uplink data in subframe #1. The terminal apparatus accommodated by the base station apparatus 10 does not transmit the uplink data in subframe #2. The UE 13 to the UE 14 transmit the uplink data in subframe #3. The base station apparatus 10 receives the uplink data in subframes #0 and #1 from the terminal apparatuses the number of which exceeds the number of receive antennas (non-orthogonal multiple access).

The base station apparatus 10 detects the uplink data of the terminal apparatuses received in subframe #0. The base station apparatus transmits an ACK/NACK for the uplink data transmitted based on the scheduling grant of the UE 1 and the UE 2 at a prescribed transmission timing to each terminal apparatus (ACK/NACK #0-1, ACK/NACK #0-2). On the other hand, the base station apparatus transmits a bundled ACK/NACK for the grant-free transmission uplink data of the UE 3 to the UE 8 at a prescribed transmission timing. Specifically, in a case that the base station apparatus successfully detects all the uplink data of the UE 3 to the UE 8, the base station apparatus transmits ACKs (transmits a bundled ACK) at a prescribed transmission timing (ACK/NACK #0) in the downlink. In a case that the base station apparatus fails to successfully detect even one piece of the uplink data of the UE 3 to the UE 8, the base station apparatus transmits a NACK (transmits a bundled NACK) at a prescribed transmission timing (ACK/NACK #0) in the downlink.

The base station apparatus 10 detects each piece of the uplink data received in subframe #1. The uplink data of the UE 9 to the UE 12 is grant-free transmitted. Therefore, in a case that the base station apparatus successfully detects all the uplink data of the UE 9 to the UE 12, the base station apparatus transmits a bundled ACK at a prescribed transmission timing (ACK/NACK #1) in the downlink. On the other hand, in a case that the base station apparatus fails to successfully detect even one piece of the uplink data of the UE 9 to the UE 12, the base station apparatus transmits a bundled NACK at a prescribed transmission timing (ACK/NACK #1) in the downlink. The base station apparatus 10 does not detect an identification signal/uplink data in subframe #2, and therefore, does not transmit an ACK/NACK.

The base station apparatus 10 detects each piece of the uplink data received in subframe #3. The UE 13 is the grant-free transmission uplink data. Therefore, in a case that the base station apparatus successfully detects the uplink data of the UE 13, the base station apparatus transmits a bundled ACK at a prescribed transmission timing (ACK/NACK #3) in the downlink. In a case that the base station apparatus fails to successfully detect the uplink data of the UE 13, the base station apparatus transmits a bundled NACK at a prescribed transmission timing (ACK/NACK #3) in the downlink. On the other hand, the UE 14 is the scheduling grant-based transmission uplink data. Therefore, the base station apparatus transmits an ACK/NACK for the uplink data of the UE 14 at a prescribed transmission timing (ACK/NACK #3-14) to each terminal apparatus.

In the base station apparatus 10 according to the present embodiment, the higher layer processing unit 101 generates a HARQ indicator (bit sequence indicating an ACK/NACK) based on an error detection result. The HARQ indicator for the uplink data transmitted based on the scheduling grant is output for each terminal apparatus (FIG. 4). The HARQ indicator for the grant-freely transmitted uplink data is output for each subframe (FIG. 5). The higher layer processing unit 101 and the transmitter 103 generate the physical retransmission request indicator channel transmitting multiple ACKs/NACKs by multiplying a spread code sequence. In generating the physical retransmission request indicator channel, in a case of spread-sequencing a bit sequence of the bundled ACK/NACK, the transmitter 103 associates the spread sequence with the identifier unique to the grant-free transmission generated using the parameter shared by the multiplexed terminal apparatuses. On the other hand, in a case of spread-sequencing a bit sequence of the ACK/NACK for each terminal apparatus, the transmitter 103 associates the spread sequence with the parameter for the terminal apparatus-specific identification signal (cyclic shift value, OCC or the like) or terminal apparatus-specific identifier relating to the grant-free transmission.

As another aspect, the higher layer processing unit 101 and the transmitter 103 generate the physical retransmission request indicator channel by adding a CRC. In generating the physical retransmission request indicator channel, in a case of transmitting a bit sequence of the bundled ACK/NACK, the transmitter 103 associates the CRC parity bits with the identifier unique to the grant-free transmission generated using the parameter shared by the multiplexed terminal apparatuses. For example, the CRC parity bits are scrambled (in other words, exclusive-ORed or masked) with the identifier unique to the grant-free transmission. On the other hand, in a case of transmitting a bit sequence of the ACK/NACK for each terminal apparatus, the transmitter 103 scrambles the CRC parity bits with the terminal apparatus-specific identification signal or terminal apparatus-specific identifier relating to the grant-free transmission.

The resource on which the physical retransmission request indicator channel is transmitted may be configured using the cyclic shift value, OCC and the like used for generating the identification signal in the frequency domain. The resource on which the physical retransmission request indicator channel is transmitted may be configured using the subframe/slot/symbol that the identification signal has been transmitted.

As described above, in the communication system according to the present embodiment, a bundled ACK/NACK or an ACK/NACK for each terminal apparatus is selected depending on whether the uplink data is of the grant-free transmission or the scheduling grant-based transmission. This can suppress the downlink radio resource being tightened caused by an increase in the number of ACK/NACK transmissions in the grant-free multiple access accommodating a large number of terminal apparatuses. The base station apparatus can consider that the grant-free transmission uplink data includes an identification error of the terminal apparatus, and therefore, the base station apparatus and the terminal apparatus can efficiently perform the retransmission control in the grant-free multiple access in which the base station apparatus cannot schedule in advance the resource on which the uplink data is transmitted.

Note that the communication system according to the present embodiment may use both the physical retransmission request indicator channel transmitting multiple ACKs/NACKs generated by multiplying a spread code sequence, and the physical retransmission request indicator channel generated by adding a CRC The base station apparatus may use the physical retransmission request indicator channel transmitting multiple ACKs/NACKs generated by multiplying the spread code sequence (the former) for the bundled ACK/NACK transmission, and the physical retransmission request indicator channel generated by adding the CRC (the latter) for the ACK/NACK transmission for each UE.

Third Embodiment

The present embodiment is an example of a case that a bundled ACK/NACK is applied to some pieces of the uplink data. In the communication system according to the present embodiment, a bundled ACK/NACK is applied depending on the number of bits of the uplink data. The communication system according to the present embodiment is configured to include the base station apparatuses 10 and terminal apparatus 20 described in FIG. 1 to FIG. 9. Hereinafter, differences from/additions to the first embodiment are mainly described.

Figure 11:
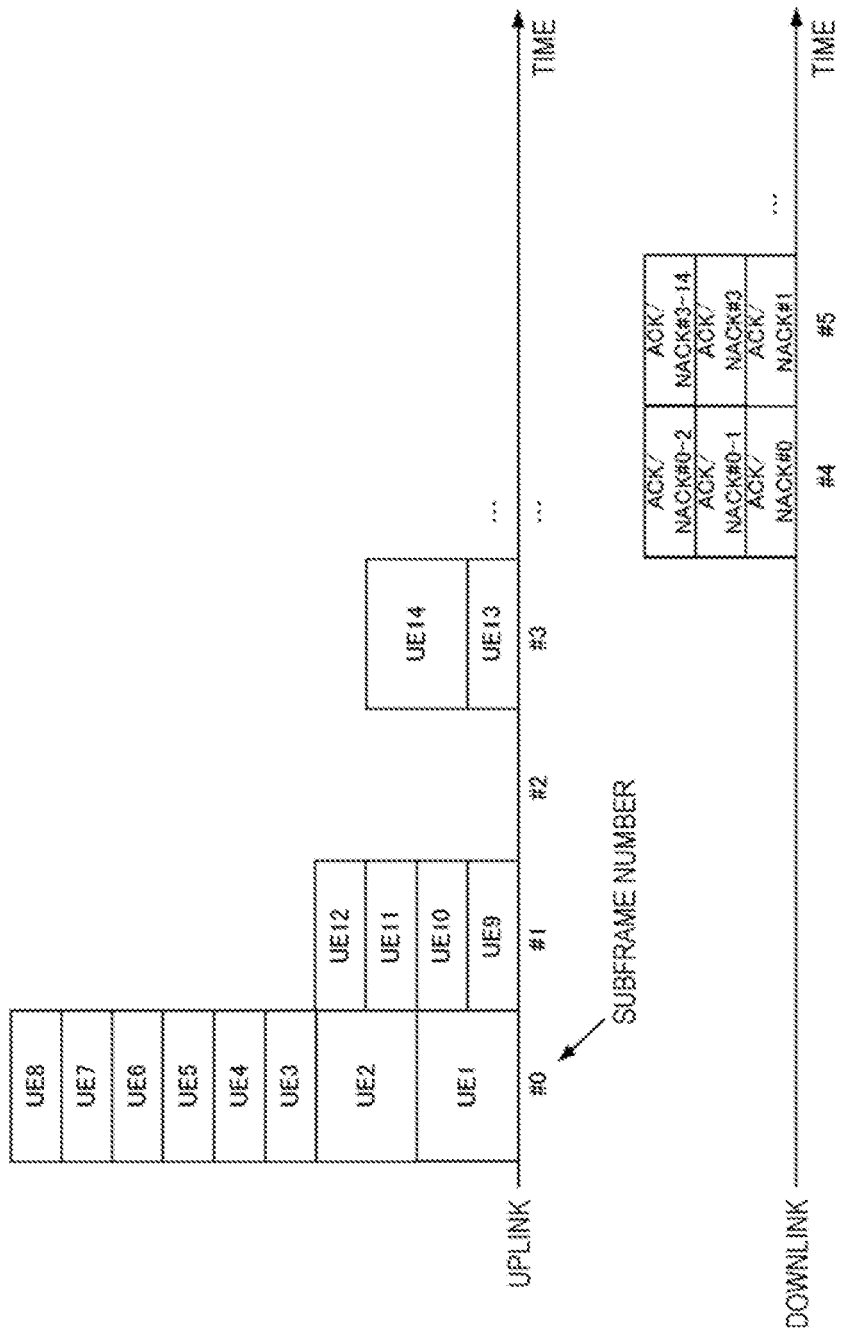
FIG. 11 is a diagram illustrating an example of ACK/NACK transmission for the uplink data according to a third embodiment.

FIG. 11 is a diagram illustrating an example of ACK/NACK transmission for the uplink data according to the present embodiment. A UE 1 to a UE 14 correspond to the uplink data of the terminal apparatus 20-1 to the terminal apparatus 20-14, respectively. ACK/NACK #0 to ACK/NACK #3 are ACKs/NACKs for the uplink data in subframes #0 to #3, respectively (bundled ACK/NACK in each subframe). ACK/NACK #m-n represents an ACK/NACK for a UE #n received in subframe #m (ACK/NACK for each terminal apparatus).

Here, assume that the number of receive antennas of the base station apparatus 10 is two, and the number of transmit antennas of the terminal apparatus 20 is one. In FIG. 11, the UE 1 to the UE 14 may be the uplink data transmitted based on the scheduling grant, or the grant-free transmission uplink data. To be more specific, the uplink data transmitted based on the scheduling grant and the grant-free transmission uplink data are present in a combined manner.

The communication system according to the present embodiment applies a bundled ACK/NACK in a case that a size of the uplink data is equal to or less than a prescribed threshold. The threshold can be defined by the number of bits of the uplink data/the number of resource blocks transmitted by each terminal apparatus. In FIG. 11, each of the UE 1, the UE 2, and the UE 14 illustrates the uplink data having a data size larger than the threshold configured by the base station apparatus. Each of the UE 3 to the UE 13 illustrates the uplink data having a data size equal to or less than the threshold configured by the base station apparatus.

The base station apparatus configures the threshold and notifies the terminal apparatuses of the configured threshold. The base station apparatus can include the threshold in the system information such as the MIB and the SIB. The base station apparatus may include the threshold in the RRC message. The base station apparatus may include the threshold in the downlink control information.

The terminal apparatus can explicitly notify the base station apparatus of a size of the uplink transmission data with the UE Capability/RRC message/uplink control information and the like. The size of the uplink transmission data can be also associated with the parameter for the identification signal (an identification signal sequence length, a cyclic shift amount, etc.). For example, the number of frequency domain resources (the number of subcarriers) and a sequence length of the identification signal in the uplink transmission data are configured to be identical. The base station apparatus identifies the terminal apparatus with the identification signal, and then, implicitly recognizes the size of the uplink transmission data.

The UE 1 to the UE 8 transmit the uplink data in subframe #0 (identical frequency/identical time). The UE 9 to the UE 12 transmit the uplink data in subframe #1. The terminal apparatus accommodated by the base station apparatus 10 does not transmit the uplink data in subframe #2. The UE 13 to the UE 14 transmit the uplink data in subframe #3. The base station apparatus 10 receives the uplink data in subframes #0 and #1 from the terminal apparatuses the number of which exceeds the number of receive antennas.

The base station apparatus 10 detects the uplink data of the terminal apparatuses received in subframe #0. The base station apparatus 10 transmits an ACK/NACK for the uplink data UE 1 and UE 2 having the data size exceeding the threshold at a prescribed transmission timing for each terminal apparatus (ACK/NACK #0-1, ACK/NACK #0-2). On the other hand, the base station apparatus transmits a bundled ACK/NACK for the uplink data UE 3 to UE 8 having the data size equal to or less than the threshold at a prescribed transmission timing. Specifically, in a case that the base station apparatus successfully detects all the uplink data of the UE 3 to the UE 8, the base station apparatus transmits an ACK (transmits a bundled ACK) at a prescribed transmission timing (ACK/NACK #0) in the downlink. In a case that the base station apparatus fails to successfully detect even one piece of the uplink data of the UE 3 to the UE 8, the base station apparatus transmits a NACK (transmits a bundled NACK) at a prescribed transmission timing (ACK/NACK #0) in the downlink.

The base station apparatus 10 detects each piece of the uplink data received in subframe #1. The data sizes of the uplink data UE 9 to UE 12 are equal to or less than the threshold. Therefore, the base station apparatus transmits a bundled ACK/NACK for the uplink data of the UE 9 to the UE 12 at a prescribed transmission timing (ACK/NACK #1).

The base station apparatus 10 detects each piece of the uplink data received in subframe #3. The uplink data UE 13 has a data size equal to or less than the threshold. Therefore, the base station apparatus transmits a bundled ACK/NACK for the uplink data of the UE 13 at a prescribed transmission timing (ACK/NACK #3) in the downlink. On the other hand, the uplink data UE 14 has a data size equal to or more than the threshold. Therefore, the base station apparatus transmits an ACK/NACK for the uplink data of the UE 14 at a prescribed transmission timing (ACK/NACK #3-14) to each terminal apparatus. Note that FIG. 11 illustrates a case that the transmission timing for ACK/NACK #3 is configured to be ½ of the transmission timing for ACK/NACK #1.

In the base station apparatus 10, the higher layer processing unit 101 and the transmitter 103 generate the physical retransmission request indicator channel transmitting multiple ACKs/NACKs by multiplying a spread code sequence. In generating the physical retransmission request indicator channel, in a case of spread-sequencing a bit sequence of the bundled ACK/NACK, the transmitter 103 associates the spread sequence with the identifier generated using the parameter shared by the multiplexed terminal apparatuses. The parameter shared by the terminal apparatuses can include the subframe number/slot number/symbol number/system frame number/frequency resource that the uplink data/identification signal have been transmitted. For example, the generation parameter for the spread sequence includes the parameter shared by the terminal apparatuses. On the other hand, in a case of spread-sequencing a bit sequence of the ACK/NACK for each UE, the transmitter 103 associates the spread sequence with the parameter for the terminal apparatus-specific identification signal or the terminal apparatus-specific identifier. The parameter for the terminal apparatus-specific identification signal includes the identification signal sequence (orthogonal sequence/quasi-orthogonal sequence), and the cyclic shift amount, OCC and the like applied to the identification signal sequence. The terminal apparatus-specific identifier includes the C-RNTI, the identifier unique to the grant-freely transmitting terminal apparatus, and the like allocated to each terminal apparatus.

As another aspect, the higher layer processing unit 101 and the transmitter 103 generate the physical retransmission request indicator channel by adding a CRC. In generating the physical retransmission request indicator channel, in a case of transmitting a bit sequence of the bundled ACK/NACK, the transmitter 103 associates the CRC parity bits with the identifier generated using the parameter shared by the multiplexed terminal apparatuses. For example, the CRC parity bits are scrambled (in other words, exclusive-ORed or masked) with the identifier. On the other hand, in a case of transmitting a bit sequence of the ACK/NACK for each UE, the transmitter 103 associates the CRC parity bits with the parameter for the terminal apparatus-specific identification signal or the terminal apparatus-specific identifier.

As described above, in the communication system according to the present embodiment, a bundled ACK/NACK is applied to some pieces of the uplink data. Specifically, an ACK/NACK for each terminal apparatus is transmitted for the uplink data of a large size, and a bundled ACK/NACK is transmitted for the uplink data of a small size. This can suppress the downlink radio resource being tightened caused by an increase in the number of ACK/NACK transmissions in the grant-free multiple access accommodating a large number of terminal apparatuses. A fine ACK/NACK is transmitted for the uplink data of a large size, and therefore, the uplink radio resource being tightened caused by retransmission of the uplink data of a large size can be suppressed. Therefore, in the communication system according to the present embodiment, in a case that the grant-free multiple access and the scheduling grant multiple access are present in a combined manner, and a large number of terminal apparatuses are accommodated, the base station apparatus and terminal apparatus can efficiently perform the retransmission control.

Fourth Embodiment

The communication system according to the present embodiment is configured to include the base station apparatus 10 and terminal apparatuses 20 described in FIG. 1 to FIG. 11. Hereinafter, differences from/additions to the first to third embodiments are mainly described.

In the communication system according to the present embodiment, multiple kinds of negative acknowledgements (NACKs) are used. The kind of NACK is associated with a reason thereof. As an aspect, a reason for NACK is associated with information about a number of terminal apparatuses which the base station apparatus has identified in a prescribed time resource. For example, a NACK is classified depending on whether or not the number of terminal apparatuses which the base station apparatus has identified in a prescribed time resource is equal to or less than a threshold.

A first NACK (a first negative acknowledgement) is transmitted in a case that the number of terminal apparatuses which the base station apparatus has identified in a prescribed time resource is equal to or less than the threshold. For example, the prescribed time resource is configured in units of a subframe that is a time unit in which the terminal apparatus allocates the uplink data. The prescribed time resource may be configured in units of a slot/frame.

The base station apparatus can configure the threshold as the number of terminal apparatuses which base station apparatus can accommodate. For example, the base station apparatus can configure the threshold by using the number of receive antennas of the base station apparatus. The base station apparatus can also configure the threshold by using the number of resource blocks of the multiplexed uplink data. The base station apparatus can configure the threshold by using the parameter for the identification signal. The parameter for the identification signal can include the number of orthogonal sequences (the number of quasi-orthogonal sequences)/the number of cyclic shift patterns/the number of OCC patterns. For example, the threshold is the number of identification signals which can be generated using the parameter for the identification signal.

The base station apparatus can configure the threshold by using the number of configured physical retransmission request indicator channels. In the physical retransmission request indicator channel transmitting multiple ACKs/NACKs generated by multiplying a spread code sequence, the number of configured physical retransmission request indicator channels can be the number of multiplexed physical retransmission request indicator channels. In the physical retransmission request indicator channel generated by adding a CRC, the number of configured physical retransmission request indicator channels can be the number of terminal apparatuses which can be included in one physical retransmission request indicator channel (the number of ACKs/NACKs used to generate the CRC). The base station apparatus may configure the threshold to be a coefficient depending on the reception capability of the base station apparatus.

A second NACK (a second negative acknowledgement) is transmitted in a case that the number of terminal apparatuses which the base station apparatus has identified in a prescribed time resource exceeds the threshold. The base station apparatus can apply the same criteria as the first NACK to the prescribed time resource and the threshold. Note that the base station apparatus may transmit a third NACK which is transmitted in a case that the base station apparatus does not identify the terminal apparatus in a prescribed time resource.

As another aspect, a reason for NACK may be associated with information about a retransmission method/information about retransmission data. For example, NACKs are classified depending on a relationship between the uplink data of the initial transmission and the uplink data of the retransmission. The first NACK is transmitted in a case of a request for retransmission of data including at least the data not transmitted at the initial transmission. The second NACK is retransmitted in a case of a request for retransmission of the data transmitted at the initial transmission.

As another aspect, a reason for NACK may be associated with information about a retransmission resource/information about a retransmission timing. For example, NACKs are classified depending on whether or not the uplink data is retransmitted on the time resource/frequency resource identical to the initial transmission. The first NACK is transmitted in a case of a request for retransmission of the uplink data on the time resource/frequency resource identical to the initial transmission. The second NACK is transmitted in a case of a request for retransmission of the uplink data on the time resource/frequency resource different from the initial transmission.

As another aspect, a reason for NACK may be associated with a degree of the error detection of the uplink data received on a prescribed time resource. For example, NACKs are classified depending on whether an error is present in some or all pieces of the uplink data received on the identical time resource and frequency resource. The first NACK is transmitted in a case that an error is present in some pieces of the uplink data received on the identical time resource and frequency resource. The second NACK is transmitted in a case that an error is present in all pieces of the uplink data received on the identical time resource and frequency resource.

As another aspect, as for a reason for NACK, NACKs are classified depending on whether or not the signal detection processing has been performed on the uplink data. The first NACK is transmitted in a case that an error is detected as a result of the signal detection processing. The second NACK is transmitted as a result of the terminal identification processing without performing the signal detection processing. Note that NACKs may be classified depending on whether or not an advanced receiving processing such as the turbo equalization is used to perform the signal detection processing.

As another aspect, the kind of NACK may be associated with whether the NACK is a bundled NACK or a NACK for each terminal apparatus. The first NACK means a NACK for each terminal apparatus. The second NACK means a bundled NACK for the uplink data received on a prescribed time resource.

Here, concerning the ACK/NACK transmission including multiple kinds of NACKs, a description is given of a case that the number of antennas and a reception capability of the terminal apparatus are used in the configuration of the kind of NACK. Here, assume that the number of receive antennas of the base station apparatus 10 is two, and the number of transmit antennas of the terminal apparatus 20 is one. Assume that a threshold of the number of terminal apparatuses is 2×α (α represents a coefficient configured by using the reception capability). Hereinafter, a description is given of a case that the base station apparatus configures α=3 (threshold=6).

Figure 12:
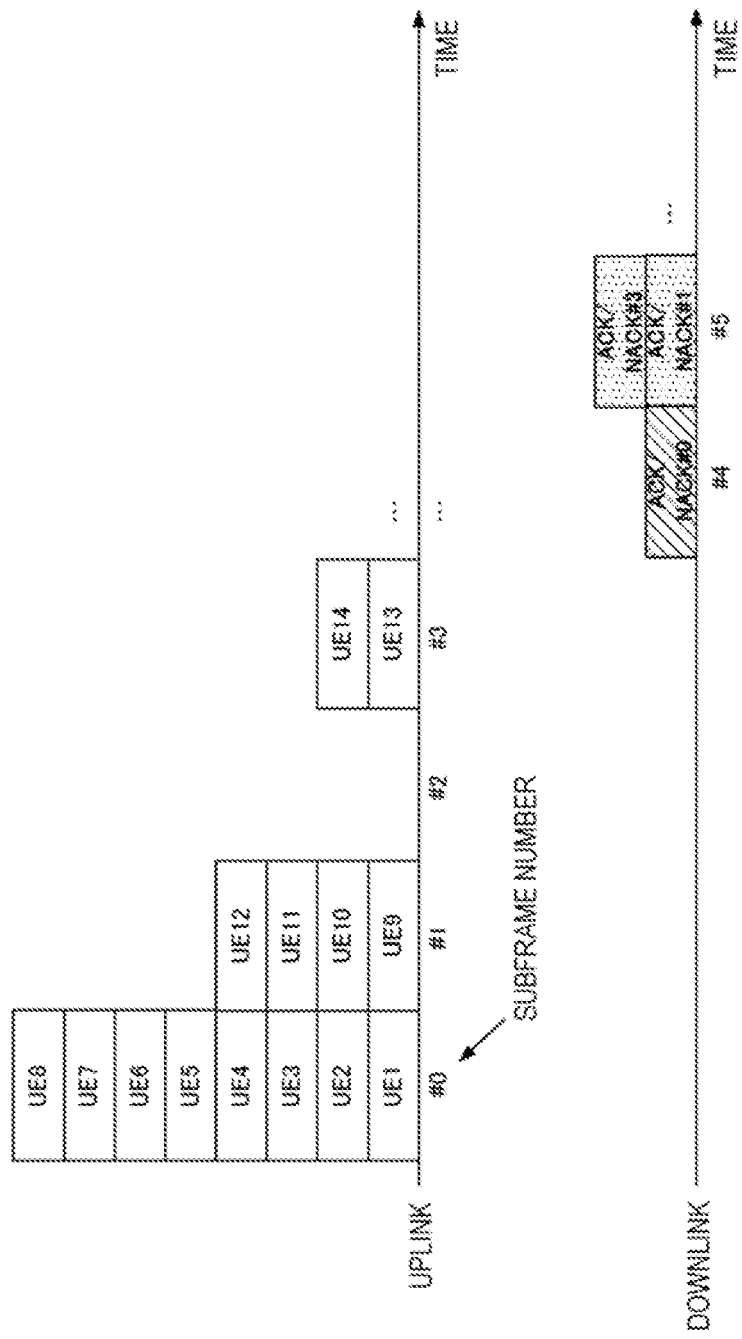
FIG. 12 is a diagram illustrating an example of ACK/NACK transmission for the uplink data according to a fourth embodiment.

FIG. 12 is a diagram illustrating an example of ACK/NACK transmission for the uplink data according to the present embodiment. A UE 1 to a UE 14 correspond to the uplink data of the terminal apparatus 20-1 to the terminal apparatus 20-14, respectively. Each terminal apparatus grant-freely transmits the uplink data. ACK/NACK #0 to ACK/NACK #3 are bundled ACKs/NACKs for the uplink data in subframes #0 to #3, respectively. FIG. 12 illustrates a case that the first NACK as well as the second NACK are transmitted using a bundled ACK/NACK.

In FIG. 12, the uplink data UE 1 to UE 8 are transmitted in subframe #0 (identical frequency/identical time). The base station apparatus uses the identification signal to identify the terminal apparatus having transmitted the uplink data in subframe #0. The base station apparatus identifies eight terminal apparatuses UE 1 to UE 8 (the base station apparatus recognizes the number of multiplexed terminal apparatuses in subframe #0 as eight). The base station apparatus determines the number of multiplexed terminal apparatuses in subframe #0 exceeds the prescribed value (=6). In this case, the base station apparatus transmits the second NACK to the UE 1 to the UE 8 at a prescribed transmission timing (ACK/NACK #0) (hatched part with lines upward to the right).

The uplink data UE 9 to UE 12 are transmitted in subframe #1. The base station apparatus uses the identification signal to identify the terminal apparatus having transmitted the uplink data in subframe #0. The base station apparatus identifies four terminal apparatuses UE 9 to UE 12 (that is, the base station apparatus recognizes the number of multiplexed terminal apparatuses in subframe #1 as four). The base station apparatus determines the number of multiplexed terminal apparatuses in subframe #1 is equal to or less than the prescribed value (=6). In this case, the base station apparatus performs the signal detection processing by the signal detection unit 1043 on the uplink data UE 9 to UE 12 transmitted by the identified terminal apparatuses. In a case that the base station apparatus successfully detects all the uplink data of the UE 9 to the UE 12, the base station apparatus transmits an ACK at a prescribed transmission timing (ACK/NACK #1) in the downlink. On the other hand, in a case that the base station apparatus fails to successfully detect even one piece of the uplink data of the UE 9 to the UE 12, the base station apparatus transmits the first NACK (shaded portion) at a prescribed transmission timing (ACK/NACK #1) in the downlink.

Similarly, the base station apparatus uses the identification signal to identify the terminal apparatus in subframe #3. The base station apparatus identifies two terminal apparatuses UE 13 and UE 14 in subframe #3, and determines that the number of multiplexed terminal apparatuses is equal to or less than the threshold (=6). Next, the base station apparatus performs the signal detection processing on the uplink data UE 13 and UE 14 transmitted by the identified terminal apparatuses. In a case that the base station apparatus successfully detects all the uplink data of the UE 13 and the UE 14, the base station apparatus transmits an ACK at a prescribed transmission timing (ACK/NACK #3). On the other hand, in a case that the base station apparatus fails to successfully detect even one piece of the uplink data of the UE 13 and the UE 14, the base station apparatus transmits the first NACK (shaded portion) at a prescribed transmission timing (ACK/NACK #3).

Figure 13:
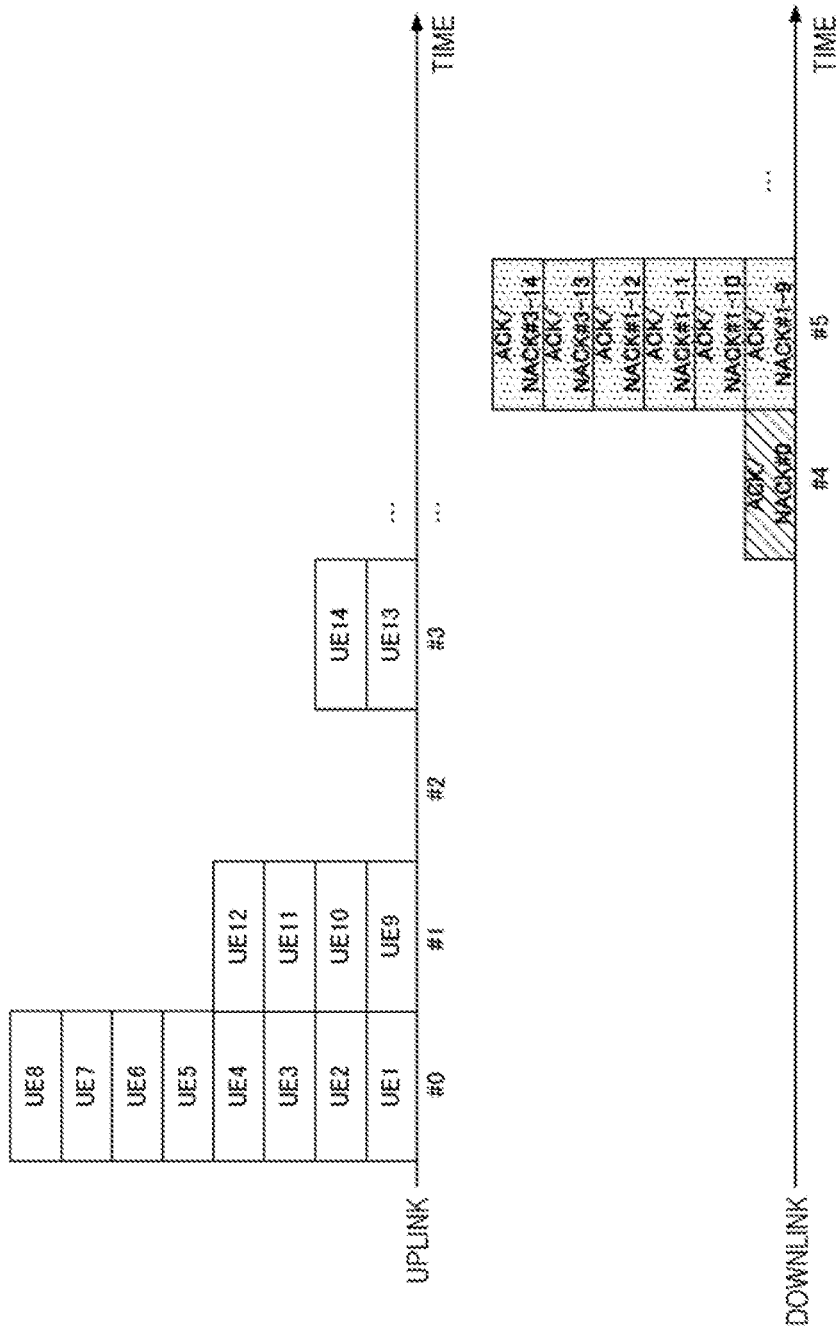
FIG. 13 is a diagram illustrating another example of the ACK/NACK transmission for the uplink data according to the fourth embodiment.

FIG. 13 is a diagram illustrating another example of the ACK/NACK transmission for the uplink data according to the present embodiment. ACK/NACK #0 to ACK/NACK #3 are a bundled ACK/NACK for the uplink data in subframes #0 to #3. ACK/NACK #m-n represents an ACK/NACK for a UE #n received in subframe #m. FIG. 13 illustrates a case that the first NACK is transmitted using a bundled ACK/NACK, and the second NACK is transmitted using an ACK/NACK for each terminal apparatus.

In FIG. 13, a bundled ACK/NACK can be adopted depending on the threshold. In a case that the number of terminal apparatuses exceeds the threshold, the base station apparatus adopts a bundled ACK/NACK. In a case that the number of terminal apparatuses is equal to or less than the threshold, the base station apparatus adopts an ACK/NACK for each terminal apparatus.

In FIG. 13, the base station apparatus identifies eight terminal apparatuses UE 1 to UE 8 in subframe #0 (that is, the base station apparatus recognizes the number of multiplexed terminal apparatuses in subframe #0 as eight). Because the number of multiplexed terminal apparatuses in subframe #0 exceeds the threshold (=6), the base station apparatus transmits a bundled ACK/NACK #0. Furthermore, the base station apparatus transmits the second NACK to the UE 1 to the UE 8 at a prescribed transmission timing (ACK/NACK #0) (hatched part with lines upward to the right).

The base station apparatus uses the identification signal to identify four terminal apparatuses UE 9 to UE 12 in subframe #1 (the base station apparatus recognizes the number of multiplexed terminal apparatuses in subframe #1 as four). The number of multiplexed terminal apparatuses in subframe #1 is equal to or less than prescribed value (=6), and thus the base station apparatus transmits an ACK/NACK for each terminal apparatus. Furthermore, the base station apparatus performs the signal detection processing by the signal detection unit 1043 on the uplink data UE 9 to UE 12 transmitted by the identified terminal apparatuses. The base station apparatus transmits an ACK/NACK to each terminal apparatus (ACK/NACK #1-9 to ACK/NACK #1-12), based on results of the detection of the uplink data UE 9 to UE 12. In this case, the base station apparatus transmits the first NACK (shaded portion) to the uplink data where an error has been detected.

Similarly, the base station apparatus uses the identification signal to identify the terminal apparatus in subframe #3. The number of multiplexed terminal apparatuses is equal to or less than the threshold (=6) in subframe #3, and thus the base station apparatus performs the signal detection processing on the uplink data UE 13 and UE 14 transmitted by the identified terminal apparatuses. The base station apparatus transmits an ACK/NACK for each terminal apparatus (ACK/NACK #1-13 to ACK/NACK #1-14), based on results of the detection of the uplink data UE 13 to UE 14. In this case, the base station apparatus transmits the first NACK (shaded portion) to the uplink data where an error has been detected.

As described above, in a case that the number of terminal apparatuses exceeds the number of terminal apparatuses which the base station apparatus can accommodate in the grant-free multiple access, the base station apparatus transmits a NACK without performing the signal detection processing. This enables the base station apparatus to efficiently perform the retransmission control even in a case that a large number of terminal apparatuses are present.

Figure 14:
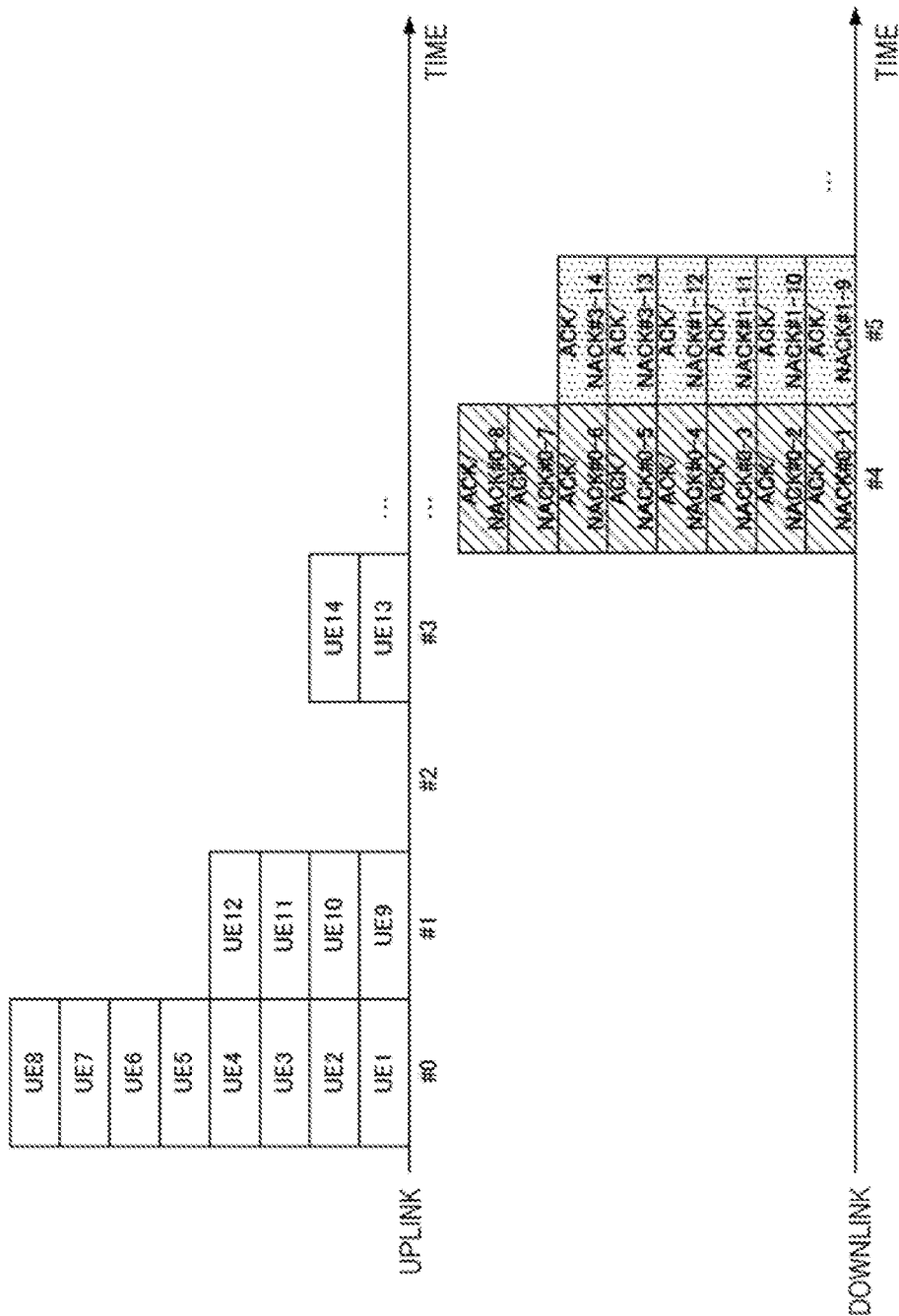
FIG. 14 is a diagram illustrating another example of the ACK/NACK transmission for the uplink data according to the fourth embodiment.

FIG. 14 is a diagram illustrating another example of the ACK/NACK transmission for the uplink data according to the present embodiment. ACK/NACK #m-n represents an ACK/NACK for a UE #n received in subframe #m. FIG. 14 illustrates a case that the first NACK and the second NACK are transmitted using an ACK/NACK for each terminal apparatus.

In FIG. 14, the base station apparatus identifies eight terminal apparatuses UE 1 to UE 8 in subframe #0 (that is, the base station apparatus recognizes the number of multiplexed terminal apparatuses in subframe #0 as eight). Furthermore, the base station apparatus performs the signal detection processing by the signal detection unit 1043 on the uplink data UE 1 to UE 8 transmitted by the identified terminal apparatuses. The base station apparatus transmits an ACK/NACK to each terminal apparatus (ACK/NACK #0-1 to ACK/NACK #0-8) based on results of the detection of the uplink data UE 9 to UE 14. The number of multiplexed terminal apparatuses in subframe #0 exceeds the threshold (=6), and thus the base station apparatus transmits the second NACK (hatched part with lines upward to the right) in a case the detection results include an error.

The base station apparatus uses the identification signal to identify four terminal apparatuses UE 9 to UE 12 in subframe #1. The base station apparatus uses the identification signal to identify two terminal apparatuses UE 13 and UE 14 in subframe #3. The number of multiplexed terminal apparatuses is equal to or less than the prescribed value (=6) in subframes #1 and #3, and thus the base station apparatus performs the signal detection processing by the signal detection unit 1043 on the uplink data UE 9 to UE 14 transmitted by the identified terminal apparatuses. The base station apparatus transmits an ACK/NACK to each terminal apparatus (ACK/NACK #1-9 to ACK/NACK #1-12 and ACK/NACK #3-13 to ACK/NACK #3-14), based on results of the detection of the uplink data UE 9 to UE 14. In this case, the base station apparatus transmits the first NACK (shaded part) to the uplink data where an error has been detected.

The base station apparatus identifies no terminal apparatus in subframe #2, and thus, does not transmit any ACK/NACK. Here, in a case that the base station apparatus 10 fails to identify the uplink data in subframe #2 in spite of the uplink data being transmitted, the terminal apparatus having transmitted the uplink data determines a NACK after elapse of a prescribed time from the uplink data transmission time. In this case, the terminal apparatus considers that the second NACK is transmitted, and retransmits the uplink data.

Note that the base station apparatus may also transmit a NACK indicating that the uplink data is not identified (e.g., the third NACK) for subframe #2 where no terminal apparatus is identified. This allows the terminal apparatus having transmitted the uplink data in the subframe to know that the terminal apparatus itself has not been identified.

Next, a description is given of an example of generating the physical retransmission request indicator channel according to the present embodiment. The higher layer processing unit 101 inputs a HARQ indicator (delivery confirmation, ACK/NACK) with multiple kinds of NACKs to the transmitter 103. Assume that the HARQ indicator is $a_{n0}, a_{n1}, \ldots, a_{nL}$. The index n depends on a unit for transmitting the HARQ indicator. In the case that an ACK/NACK is transmitted for each terminal apparatus, n represents an ACK/NACK for the uplink data of the terminal apparatus 20-n. In the case that a bundled ACK/NACK is transmitted for each subframe, n represents an ACK/NACK for the uplink data transmitted in the subframe n. An index L represents the number of bits of the HARQ indicator.

In a case that the number of bits of a bundled ACK/NACK for the subframe n is two, the HARQ indicator "$a_{n0}, a_{n1}$" indicates the first NACK by "00", the second NACK by "01", and an ACK by "11". In the HARQ indicator "$a_{n0}, a_{n1}$", it can be said that $a_{n0}$ is a bit indicating an ACK/NACK and $a_{n1}$ is a bit indicating a kind (or reason) of NACK. For example, in a case that a reason for NACK is associated with the information about a number of terminal apparatuses identified in a prescribed time resource, $a_{n1}$="0" means that the number of terminal apparatuses is equal to or less than the threshold, and $a_{n1}$="1" means that the number of terminal apparatuses exceeds the threshold. Note that the first NACK "00" may include a NACK for the uplink data transmitted based on the scheduling grant.

A description is given of an example of generating the physical retransmission request indicator channel transmitting multiple ACKs/NACKs by multiplying a spread code sequence. The code unit 1031 may perform repetition on the HARQ indicator. For example, in a case that the repetition is performed three times on a two-bit HARQ indicator "$a_{n0}, a_{n1}$", the first NACK, the second NACK, and the ACK are repeated to be "000000", "010101", and "111111", respectively. The modulating unit 1032 performs the data modulation on the output data from the code unit 1031. For example, the QPSK is used to perform the data modulation. This can suppress increase in the number of bits caused by using multiple kinds of NACKs (e.g., a two-bit ACK/NACK can be made to have the number of bits the same as a case of indicating an ACK/NACK by one bit). Note that in the case that an ACK/NACK is indicated by one bit, the base station apparatus and the terminal apparatus may consider a NACK "0" as the first NACK "00" and an ACK "1" as an ACK "11" for the processing.

Furthermore, the modulating unit 1032 multiplies data after the data modulation by a prescribed sequence (spread sequence) (data after the data modulation is spread by a prescribed sequence). For the spread sequence, an orthogonal sequence (or quasi-orthogonal sequence) can be used. In the case of the bundled ACK/NACK transmission, the spread sequence may be associated with the parameter shared by the multiplexed terminal apparatuses such as the identifier unique to the grant-free transmission. The spread sequence is associated with the identifier generated using the parameter shared by the multiplexed terminal apparatuses. The parameter shared by the terminal apparatuses can include the subframe number/slot number/symbol number/system frame number/frequency resource that the uplink data/identification signal have been transmitted. For example, the generation parameter for the spread sequence includes the parameter shared by the terminal apparatuses. On the other hand, in the case of the ACK/NACK transmission for each terminal apparatus, the spread sequence may be associated with the parameter for the terminal apparatus-specific identification signal or the terminal apparatus-specific identifier. The parameter for the terminal apparatus-specific identification signal includes the identification signal sequence (orthogonal sequence/quasi-orthogonal sequence), and the phase rotation amount, cyclic shift amount, interleaver pattern, OCC, and the like applied to the identification signal sequence. The terminal apparatus-specific identifier includes the C-RNTI, the identifier unique to the grant-freely transmitting terminal apparatus, and the like allocated to each terminal apparatus. For example, an ACK/NACK for each terminal apparatus is spread by the identification signal sequence/sequence generated using the parameter for the terminal apparatus-specific identification signal.

As another aspect, a description is given of the case that the physical retransmission request indicator channel is generated by adding a CRC. The higher layer processing unit 101 can add CRC parity bits to the information about an uplink data retransmission including multiple HARQ indicators. Assuming that x is a bit sequence of the HARQ indicator and p is a CRC parity bit sequence, the bit sequence after adding the CRC is represented as "$x_0, x_1, \ldots x_{q-1}, p_0, p_1, \ldots p_{r-1}$" (q is total number of bits of the ACK/NACK and r is the number of CRC parity bits). The bit sequence of the HARQ indicator includes ACK/NACK fields for the uplink data. Note that the ACK/NACK field for the uplink data can include a bit sequence of the information about an uplink data retransmission.

For example, the CRC parity bits are added to multiple ACKs/NACKs for an identical transmission timing. The base station apparatus can configure a bit sequence length of the HARQ indicator x (or, the number of ACK/NACK fields), based on the number of uplink subframes. In the bundled ACK/NACK transmission, the bit sequence length q of the HARQ indicator x=the number m of subframes×the number L of bits of the HARQ indicator. Assuming that the number m of subframes=10 and the number L of bits of the HARQ indicator=2, then q=20. The bit sequence after adding the CRC "$x_0, x_1, x_2, x_3, \ldots, x_{q-1}, p_0, q_1, \ldots q_{r-1}$" is "$a_{00}, a_{01}, a_{10}, a_{11}, a_{20}, a_{21}, a_{30}, a_{31}, \ldots, a_{90}, a_{91}, p_0, q_1, \ldots q_{r-1}$". A variable $a_{m1}$ is an ACK/NACK bit for the uplink data (HARQ indicator bit). An index m represents a transmission subframe number of the uplink data, and 1 represents a bit number constituting a bundled ACK/NACK of each subframe. In this case, the HARQ indicator x includes 10 ACK/NACK fields each of which includes two bits. In the ACK/NACK transmission in subframe #5 in FIG. 12, ACK/NACK #1 is stored in "$a_{10}, a_{11}$". ACK/NACK #3 is stored in "$a_{30}, a_{31}$". Each of other bits (other than $a_{10}, a_{11}, a_{30}, a_{31}$) may store a dummy bit. In this case, the terminal apparatus acquires the ACK/NACK for the uplink data, based on the subframe number that the uplink data has been transmitted.

The base station apparatus may configure the bit sequence length of the HARQ indicator x (or the number of ACK/NACK storage fields), based on an uplink system bandwidth and the like. The base station apparatus can notify the terminal apparatus of an ACK/NACK storage field index for each piece of the uplink data by using the RRC message/downlink control channel and the like. The base station apparatus stores the ACK/NACK for the uplink data according to the storage field index notified to the terminal apparatus in advance. For example, in FIG. 13, assume that 10 ACK/NACK storage fields (ACK/NACK storage fields #1 to 10) are configured for the sequence of the HARQ indicator x. The base station apparatus notifies (allocates) the ACK/NACK storage field indexes #1 to 6 to the terminal apparatuses 9 to 14, respectively. For example, in the ACK/NACK transmission in subframe #5 in FIG. 13, the base station apparatus stores an ACK/NACK for the uplink data according to the storage field indexes notified to the terminal apparatus 9 to 14 in advance. Furthermore, the base station apparatus adds the CRC parity bits to the sequence storing the ACK/NACK for each of the terminal apparatuses 9 to 14. In this case, the terminal apparatus acquires the ACK/NACK for the uplink data, based on the storage field index notified by the base station apparatus.

The higher layer processing unit 101 scrambles (masks) the CRC parity bits "$p_0, p_1, \ldots p_{r-1}$" with the parameters shared by the multiplexed terminal apparatuses such as a sequence associated with the identifier unique to the grant-free transmission. For example, in FIGS. 12 and 13, in a case that a CRC parity bits length=16 bits, the sequence associated with the identifier unique to the grant-free transmission=1+the subframe number that the ACK/NACK is transmitted, the CRC parity bits of the ACK/NACK transmitted in subframe #5 is scrambled with a sequence "0000000000000110".

In the communication system according to the present embodiment, a bundled ACK/NACK may be scrambled with a parameter different from an ACK/NACK for each terminal apparatus. In the case of a bundled ACK/NACK, the higher layer processing unit 101 scrambles (masks) the CRC parity bits with the parameter shared by the multiplexed terminal apparatuses such as the identifier unique to the grant-free transmission. On the other hand, in the case of an ACK/NACK for each terminal apparatus, the higher layer processing unit 101 scrambles the CRC parity bits with the parameter for the terminal apparatus-specific identification signal or the terminal apparatus-specific identifier.

In the bit sequence after adding the CRC "$x_0, x_1, \ldots x_{q-1}, p_0, p_1, \ldots p_{r-1}$" (q is the number of bits of an ACK/NACK for the uplink data, and r is the number of CRC parity bits), the CRC parity bits may be allocated for each ACK/NACK for the uplink data. In the bundled ACK/NACK, an ACK/NACK for the uplink data in subframe #m is "$x_0, x_1, \ldots x_{q-1}, p_0, p_1, \ldots p_{r-1}$"="$a_{m0}, a_{m1}, a_{m2}, a_{m3}, \ldots, a_{m,\ q-1}, p_0, p_1, \ldots, p_{r-1}$" ("$a_{m0}, a_{m1}, a_{m2}, a_{m3}, \ldots, a_{m,\ q-1}$" includes the ACK/NACK storage field for the uplink data in subframe #m or/and the storage field for the information about an uplink data retransmission). Furthermore, the parity bits "$p_0, p_1, \ldots p_{r-1}$" is scrambled (masked) with the parameter shared by the multiplexed terminal apparatuses such as a sequence associated with the identifier unique to the grant-free transmission.

For example, the bit sequence, after adding the CRC, of the ACK/NACK transmitted in subframe #4 in FIG. 13 (ACK/NACK storage field or/and the number of bits of the storage field for the information about an uplink data retransmission=4) is "$x_0, x_1, x_2, x_3, p_0, p_1, \ldots p_{r-1}$"="$a_{00}, a_{01}, a_{02}, a_{03}, p_0, p_1, \ldots p_{r-1}$". In this case, "$p_0, p_1, \ldots p_{r-1}$" is scrambled with a sequence "0000000000000101" generated from subframe #4.

In an ACK/NACK for each terminal apparatus, an ACK/NACK for the uplink data UEn of the terminal apparatus 20-n is "$x_0, x_1, \ldots x_{q-1}, p_0, p_1, \ldots p_{r-1}$"="$a_{n0}, a_{n1}, a_{n2}, a_{n3}, \ldots, a_{n(q-1)}, p_0, q_1, \ldots q_{r-1}$" ("$a_{n0}, a_{n1}, a_{n2}, a_{n3}, \ldots, a_{n(q-1)}$" includes the ACK/NACK storage field for the uplink data of the terminal apparatus 20-n or/and the storage field for the information about an uplink data retransmission). To be more specific, the CRC parity bits are added for each terminal apparatus. Furthermore, the parity bits "$p_0, p_1, \ldots p_{r-1}$" is scrambled (masked) with the terminal apparatus-specific parameter.

For example, in subframe #5 in FIG. 13, the bit sequence, after adding the CRC, of the ACK/NACK for the terminal apparatus 20-9 (ACK/NACK #1-9) (the number of bits of ACK/NACK storage field or/and the storage field for the information about an uplink data retransmission=4) is "$x_0, x_1, x_2, x_3, p_0, p_1, \ldots p_{r-1}$"="$a_{90}, a_{91}, a_{92}, a_{93}, p_0, p_1, \ldots p_{r-1}$". In this case, the parity bits "$p_0, p_1, \ldots p_{r-1}$" are scrambled with the identification signal sequence of ACK/NACK #1-9. In subframe #5, the CRC parity bits are similarly added for each terminal apparatus to the ACK/NACK for each of the terminal apparatus 20-10 to the terminal apparatus 20-14.

As another aspect, a description is given of a case that, in the communication system according to the present embodiment, the HARQ indicator with multiple kinds of NACKs is indicated by one bit. In the HARQ indicator with multiple kinds of NACKs, the first NACK and the second NACK are indicated by "0", and an ACK is indicated by "1" In the physical retransmission request indicator channel transmitting multiple ACKs/NACKs generated by multiplying a spread code sequence, the first NACK and the second NACK are distinguished by the multiplied spread code sequence.

The modulating unit 1032 uses the spread sequences different between the first NACK and the second NACK. For example, the first NACK is spread by the spread code sequence associated with the parameter for the terminal apparatus-specific identification signal or the terminal apparatus-specific identifier. The second NACK is spread by the spread code associated with the parameter shared by the terminal apparatuses.

In the physical retransmission request indicator channel generated by adding a CRC, the first NACK and the second NACK are distinguished by the identifier scrambling (exclusive-ORing, or masking) the CRC parity bits. For example, the first NACK is scrambled with the parameter for the terminal apparatus-specific identification signal or the terminal apparatus-specific identifier. The second NACK is scrambled with the parameter shared by the multiplexed terminal apparatuses such as the identifier unique to the grant-free transmission.

For the physical retransmission request indicator channel, whether the physical retransmission request indicator channel transmitting multiple ACKs/NACKs generated by multiplying a spread code sequence is used, or the physical retransmission request indicator channel transmitting multiple ACKs/NACKs generated by adding a CRC is used in the first NACK and the second NACK may be configured.

Next, a description is given of the uplink data retransmitted in response to various NACKs. The terminal apparatus receives the ACK/NACK for the uplink data (initial transmission) (at S205 in FIG. 3). In a case that the terminal apparatus receives the first NACK, the terminal apparatus retransmits the data associated with that uplink data (initial transmission) (S206 in FIG. 3). The data associated with the uplink data may be the same as the uplink data transmitted at the initial transmission (that is, data bits and parity bits transmitted at the initial transmission), or may be data not transmitted at the initial transmission (that is, data bits and parity bits not transmitted at the initial transmission). The data associated with the uplink data may be data including both the uplink data transmitted at the initial transmission and the data not transmitted at the initial transmission. In this case, the base station apparatus receiving the retransmission uses the uplink data (initial transmission) and the uplink data (retransmission) to perform the signal detection processing. In the detection processing, the base station apparatus can use Chase combining and Incremental Redundancy (IR).

In a case that the terminal apparatus receives the second NACK, the terminal apparatus retransmits the same data as the uplink data (the data bits and parity bits transmitted at the initial transmission) (S206 in FIG. 3). The uplink data (retransmission) may be data including both the data bits and parity bits transmitted at the initial transmission, and the data bits and parity bits not transmitted at the initial transmission. In this case, the base station apparatus receiving the retransmission uses the uplink data (initial transmission) to perform the signal detection processing.

Next, a description is given of the retransmission timing of the uplink data in response to various NACKs. The base station apparatus transmits the information indicating a retransmission timing of the uplink data to the terminal apparatus as the system information/RRC message/downlink control information (at S203 in FIG. 3). The base station apparatus can also transmit the information indicating a retransmission timing to the terminal apparatus by use of the physical retransmission request indicator channel (at S205 in FIG. 3). For example, the information indicating a retransmission timing of the uplink data is configured with a reference time and an offset value for the reference time.

At S205 in FIG. 3, the terminal apparatus receiving the first NACK retransmits the uplink data in accordance with the reference time (that is, the offset value=0) (S206). On the other hand, the terminal apparatus receiving the second NACK retransmits the uplink data at a retransmission interval obtained from the reference time+the selected offset value (S206). The offset value may be selected by the terminal apparatus at random, or may be selected according to indication by the base station apparatus.

As described above, the communication system according to the present embodiment defines multiple kinds of NACKs depending on a reason for transmitting the NACK. For example, the kind of NACK is associated with the number of terminal apparatuses which the base station apparatus can accommodate, and the like. This enables the base station apparatus and the terminal apparatus to efficiently perform the retransmission control, in consideration of a state of the multiplexed uplink data, in the grant-free multiple access in which the base station apparatus cannot schedule in advance the resource on which the uplink data is transmitted.

Fifth Embodiment

The present embodiment is an example in which multiple kinds of negative acknowledgements (NACKs) are used in the case that the grant-free transmission uplink data and the uplink data transmitted based on the scheduling grant are transmitted on the overlapping time resource and frequency resource. The communication system according to the present embodiment is configured to include the base station apparatus 10 and terminal apparatuses 20 described in FIG. 1 to FIG. 14. Hereinafter, differences from/additions to the first to fourth embodiments are mainly described.

Figure 15:
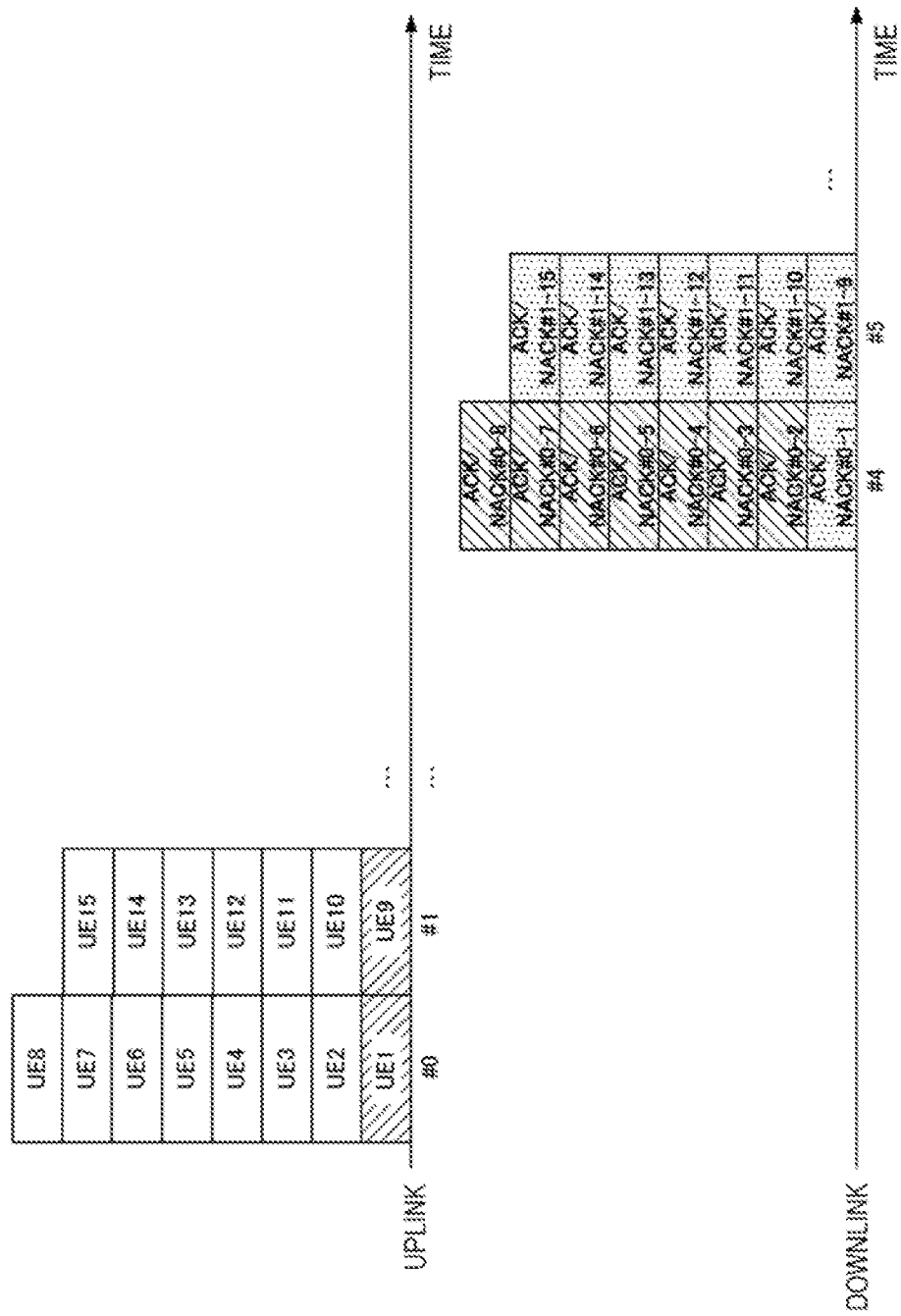
FIG. 15 is a diagram illustrating an example of ACK/NACK transmission for the uplink data according to the fifth embodiment.

FIG. 15 is a diagram illustrating an example of ACK/NACK transmission for the uplink data according to the present embodiment. A UE 1 to a UE 15 correspond to the uplink data transmitted by the terminal apparatus 20-1 to the terminal apparatus 20-15, respectively. ACK/NACK #m-n represents an ACK/NACK for a UE #n received in subframe #m. The UE 1 and the UE 9 are the uplink data transmitted based on the scheduling grant (hatched part with lines upward to the left). The UE 2 to the UE 8, and the UE 10 to the UE 15 are the uplink data grant-freely transmitted. A description is given of a case that the number of antennas and a reception capability of the terminal apparatus are used in threshold configuration of the kind of NACK. Here, assume that the number of receive antennas of the base station apparatus 10 is two, and the number of transmit antennas of the terminal apparatus 20 is one. Assume that a threshold of the number of terminal apparatuses is 2×α (α represents a coefficient configured by using the reception capability). Hereinafter, a description is given of a case that the base station apparatus configures α=3 (threshold=6).

In FIG. 15, eight pieces of uplink data UE 1 to UE 8 are transmitted in subframe #0. The base station apparatus receives, in subframe #0, the UE 1 transmitted based on the scheduling grant. Furthermore, the base station apparatus identifies seven terminal apparatuses UE 2 to UE 8 by using the identification signal in subframe #0 (the base station apparatus recognizes the number of multiplexed terminal apparatuses performing the grant-free transmission as seven in subframe #0). The base station apparatus performs the signal detection processing by the signal detection unit 1043 on the uplink data UE 1 to UE 8. The base station apparatus transmits an ACK/NACK to each terminal apparatus (ACK/NACK #0-1 to ACK/NACK #0-8), based on results of the detection of the uplink data UE 1 to UE 8.

In a case that the UE 1 transmitted based on the scheduling grant includes an error, the base station apparatus transmits the first NACK to the terminal apparatus (shaded part). On the other hand, the number of multiplexed terminal apparatuses (=7) performing the grant-free transmission exceeds the threshold (=6). For this reason, in a case that the detection results of the uplink data UE 2 to UE 8 grant-freely transmitted include an error, the base station apparatus transmits the second NACK to the terminal apparatus (hatched part with lines upward to the right).

Seven pieces of uplink data UE 9 to UE 15 are transmitted in subframe #1. The base station apparatus receives, in subframe #1, the UE 9 transmitted based on the scheduling grant. Furthermore, the base station apparatus identifies six terminal apparatuses UE 10 to UE 15 by using the identification signal in subframe #1 (the base station apparatus recognizes the number of multiplexed terminal apparatuses performing the grant-free transmission as six in subframe #1). The base station apparatus performs the signal detection processing by the signal detection unit 1043 on the uplink data UE 9 to UE 15. The base station apparatus transmits an ACK/NACK to each terminal apparatus (ACK/NACK #1-9 to ACK/NACK #1-15), based on results of the detection of the uplink data UE 9 to UE 15.

In a case that the UE 9 transmitted based on the scheduling grant includes an error, the base station apparatus transmits the first NACK to the terminal apparatus (shaded part). On the other hand, the number of multiplexed terminal apparatuses (=6) performing the grant-free transmission exceeds is equal to or less than the threshold (=6). For this reason, in a case that the detection results of the uplink data UE 10 to UE 15 grant-freely transmitted include an error, the base station apparatus transmits the first NACK to the terminal apparatus (shaded part).

As described above, the communication system according to the present embodiment defines multiple kinds of NACKs in association with the number of terminal apparatuses which the base station apparatus can accommodate. In a case that the base station apparatus receives the grant-free transmission uplink data and the uplink data transmitted based on the scheduling grant on the identical time resource and frequency resource, the base station apparatus determines the kind of NACK to be sent back, based on the number of transmission terminals of the grant-free transmission uplink data. This enables the base station apparatus and the terminal apparatus to efficiently perform the retransmission control in consideration of a state of the multiplexed uplink data.

Moreover, in the detection processing of the grant-free transmission uplink data, the base station apparatus can use the uplink data transmitted based on the scheduling grant to adopt the turbo equalization and the like. This can improve accuracy of detecting the data in the grant-free transmission in which the base station apparatus cannot schedule in advance the uplink transmission resource.

Note that the present invention can also adopt the following aspects.

(1) Specifically, an aspect of the present invention is a terminal apparatus for performing grant-free communication with a base station apparatus, the terminal apparatus including: a transmitter configured to transmit uplink data; and a receiver configured to receive information indicating a retransmission timing of the uplink data and a signal indicating a delivery confirmation for the uplink data, wherein the information indicating the retransmission timing includes multiple transmission intervals for retransmission, and in a case that the signal indicating the delivery confirmation is a delivery confirmation indicating a negative acknowledgement, the transmitter retransmits the uplink data based on a transmission interval selected from the multiple transmission intervals.

(2) According to an aspect of the present invention, the information indicating the retransmission timing includes a reference time and offset values for the reference time, the offset values include multiple transmission intervals for the reference time, and in the case that the signal indicating the delivery confirmation is the delivery confirmation indicating the negative acknowledgement, the transmitter retransmits the uplink data based on a transmission interval selected from the multiple transmission intervals included in the offset values.

(3) According to an aspect of the present invention, a range of the offset values included in the information indicating the retransmission timing is increased as the number of retransmissions increases.

(4) According to an aspect of the present invention, the signal indicating the delivery confirmation includes a delivery confirmation indicating a first negative acknowledgement associated with a parameter specific to the terminal apparatus, and a delivery confirmation including a second negative acknowledgement associated with a parameter shared by the terminal apparatuses which are identified with an identical time resource and an identical frequency resource, and in a case that the transmitter receives the delivery confirmation signal including the second negative acknowledgement, the transmitter retransmits the uplink data based on a transmission interval selected from the multiple transmission intervals included in the offset values.

(5) An aspect of the present invention is a base station apparatus for performing grant-free communication with multiple terminal apparatuses, the base station apparatus including: a receiver configured to receive an identification signal identifying each terminal apparatus having transmitted uplink data and the uplink data; and a transmitter configured to transmit information indicating a retransmission timing of the uplink data and a signal indicating a delivery confirmation for the uplink data, wherein the information indicating the retransmission timing includes a reference time and offset values for the reference time, the offset values include multiple transmission intervals for the reference time, and the transmitter uses an RRC message to transmit the reference time and transmit the offset values together with the signal indicating the delivery confirmation.

(6) According to an aspect of the present invention, the transmitter transmits the offset value to the terminal apparatus identified by the identification signal.

(7) An aspect of the present invention is a communication method of a terminal apparatus for performing grant-free communication with a base station apparatus, the communication method including the steps of: transmitting uplink data; and receiving information indicating a retransmission timing of the uplink data and a signal indicating a delivery confirmation for the uplink data, wherein the information indicating the retransmission timing includes multiple transmission intervals for retransmission, and the communication method further includes the step of in a case that the signal indicating the delivery confirmation is a delivery confirmation indicating a negative acknowledgement, retransmitting the uplink data based on a transmission interval selected from the multiple transmission intervals.

(8) An aspect of the present invention is a communication method of a base station apparatus for performing grant-free communication with multiple terminal apparatuses, the communication method including the steps of: receiving an identification signal identifying each terminal apparatus having transmitted uplink data and the uplink data; and transmitting information indicating a retransmission timing of the uplink data and a signal indicating a delivery confirmation for the uplink data, wherein the information indicating the retransmission timing includes a reference time and offset values for the reference time, the offset values include multiple transmission intervals for the reference time, and the reference time is transmitted using an RRC message and the offset values are transmitted together with the signal indicating the delivery confirmation.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In such a case, the program for implementing the functions according the embodiments may be recorded on a computer-readable recording medium. The functions may be implemented by causing a computer system to read the program recorded on this recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, a processor of known type, a controller, a microcontroller, or a state machine instead. The electrical circuit described above may be constituted by a digital circuit, or an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention.

Furthermore, a configuration in which constituent elements, described in the respective embodiments and having mutually the same effects, are substituted for one another is also included in the technical scope of the present invention.

INDUSTRIAL APPLICABILITY

The present invention can be preferably used in a base station apparatus, a terminal apparatus, and a communication method.

The present international application claims priority based on JP 2016-126323 and JP 2016-126324 filed on Jun. 27, 2016, and all the contents of JP 2016-126323 and JP 2016-126324 are incorporated in the present international application by reference.

REFERENCE SIGNS LIST

10 Base station apparatus
20-1 to 20-n Terminal apparatus
10a Range where base station apparatus 10 can connect to terminal apparatuses.
101 Higher layer processing unit
102 Controller
103 Transmitter
104 Receiver
105 Transmit antenna
106 Receive antenna
1031 Coding unit
1032 Modulating unit
1033 Downlink reference signal generation unit
1034 Multiplexing unit
1035 Radio transmitting unit
1041 Radio receiving unit
1042 Demultiplexing unit
1043 Signal detection unit
1044 Channel estimation unit
1045 Identification unit
1501 Cancelling unit
1502 Equalization unit
1503-1 to 1503-u IDFT unit
1504-1 to 1504-u Demodulation unit
1505-1 to 1505-u Decoding unit
1506 Replica generation unit
201 Higher layer processing unit
202 Controller
203 Transmitter
204 Receiver
205 Transmit antenna
206 Receive antenna
2031 Coding unit
2032 Modulating unit
2033 Uplink reference signal generation unit
2034 Multiplexing unit
2035 Radio transmitting unit
2036 Identification signal generation unit
2041 Radio receiving unit
2042 Demultiplexing unit
2043 Demodulation unit
2044 Decoding unit

The invention claimed is:

1. A base station apparatus for communicating with multiple terminal apparatuses, the base station apparatus comprising:
a receiver configured to receive an identification signal identifying each terminal apparatus having transmitted uplink data and the transmitted uplink data; and
a transmitter configured to transmit a signal indicating a delivery confirmation for the uplink data, wherein:
the signal indicating the delivery confirmation includes a first signal indicating a bundled delivery confirmation for the uplink data received from the multiple terminal apparatuses on an identical time resource and an identical frequency resource, and a second signal indicating a delivery confirmation for each terminal apparatus;
the first signal indicates that the bundled delivery confirmation is associated with a parameter shared by the multiple terminal apparatuses having transmitted the uplink data on the identical time resource and the identical frequency resource, and the parameter shared by the multiple terminal apparatuses includes a subframe number in which the uplink data has been transmitted; and
the second signal indicates that the delivery confirmation for each of the multiple terminal apparatuses is associated with a parameter specific to the terminal apparatus.

2. The base station apparatus according to claim 1, wherein the transmitter multiplies the signal indicating the bundled delivery confirmation by a sequence generated using the parameter shared by the multiple terminal apparatuses, and adds a cyclic redundancy check scrambled with the parameter specific to the terminal apparatus to the second signal.

3. The base station apparatus according to claim 1, wherein the parameter specific to the terminal apparatus includes a sequence of the identification signal.

4. The base station apparatus according to claim 1, wherein the parameter specific to the terminal apparatus includes a cyclic shift amount applied to a sequence of the identification signal.

5. The base station apparatus according to claim 1, wherein the parameter shared by the multiple terminal apparatuses includes a subframe number in which the identification signal has been transmitted.

* * * * *